US012675372B2

(12) United States Patent
Akhtar et al.

(10) Patent No.: US 12,675,372 B2
(45) Date of Patent: Jul. 7, 2026

(54) SYSTEMS AND METHODS FOR ONLINE RESTORE FROM BACKUP

(71) Applicant: Cockroach Labs, Inc., New York, NY (US)

(72) Inventors: Mohammed Bilal Akhtar, Toronto (CA); David Taylor, Brooklyn, NY (US); Michael Butler, Brooklyn, NY (US); Radu Berinde, San Diego, CA (US); Steven Danna, Bradford-On-Avon (GB); Sumeer Kumar Bhola, Brooklyn, NY (US); Andrew Scott Woods, Brooklyn, NY (US); Pallavi Liv Lobo, Metuchen, NJ (US)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 18/756,865

(22) Filed: Jun. 27, 2024

(65) Prior Publication Data

US 2026/0003742 A1 Jan. 1, 2026

(51) Int. Cl.
*G06F 11/1446* (2026.01)
*G06F 16/27* (2019.01)

(52) U.S. Cl.
CPC .......... *G06F 11/1469* (2013.01); *G06F 16/27* (2019.01); *G06F 2201/80* (2013.01)

(58) Field of Classification Search
CPC ... G06F 11/1469; G06F 16/27; G06F 2201/80
See application file for complete search history.

(56) References Cited

U.S. PATENT DOCUMENTS

| | | | | |
|---|---|---|---|---|
| 9,632,878 | B1 * | 4/2017 | Maccanti | G06F 11/1469 |
| 10,740,300 | B1 * | 8/2020 | Lakshman | G06F 16/137 |
| 2019/0034507 | A1 * | 1/2019 | Duttagupta | G06F 16/1752 |
| 2020/0012619 | A1 * | 1/2020 | Gupta | G06F 16/9027 |
| 2022/0103622 | A1 * | 3/2022 | Camargos | G06V 40/10 |
| 2022/0156231 | A1 * | 5/2022 | Wang | G06F 16/9027 |
| 2023/0080500 | A1 * | 3/2023 | Karthik | G06F 11/1451 |
| | | | | 714/6.3 |
| 2024/0054103 | A1 * | 2/2024 | Bhola | G06F 16/13 |

* cited by examiner

*Primary Examiner* — Jensen Hu
(74) *Attorney, Agent, or Firm* — Goodwin Procter LLP

(57) ABSTRACT

Systems and methods for enabling availability of backup data during restoration of a distributed database system are provided. An external storage system stores a plurality of backup files each comprising backup data and one or more backup metadata files. A plurality of ranges are generated and stored among a plurality of computing devices based on the backup files and metadata files. A plurality of virtual data files are generated and stored in the ranges, where each range of the ranges comprises one or more of the virtual data files, where the virtual data files for a respective range identify physical data configured to be stored by the respective range comprising at least a portion of the backup data of one or more of the backup files. The ranges are configured to serve, based on the virtual data files, a request directed to reading or writing the physical data.

25 Claims, 10 Drawing Sheets

400

<u>700</u>

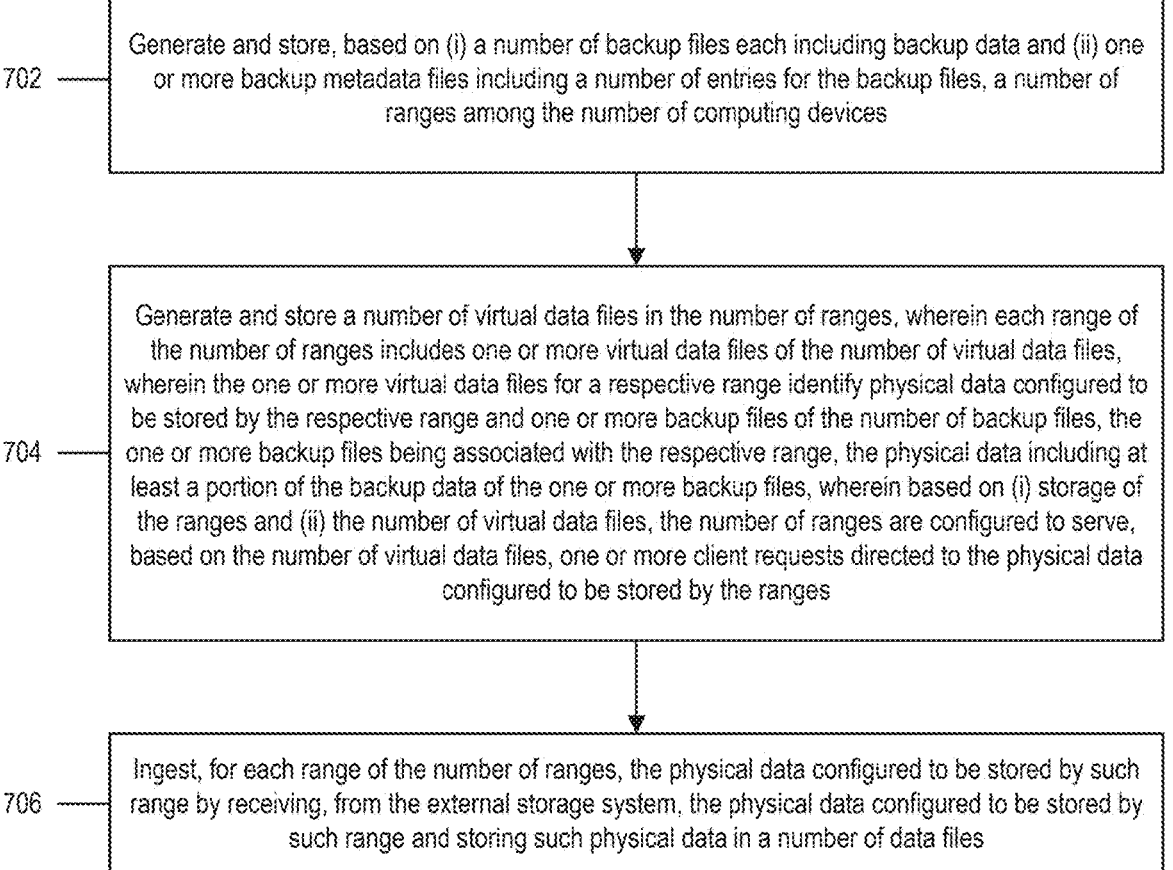

702 —— Generate and store, based on (i) a number of backup files each including backup data and (ii) one or more backup metadata files including a number of entries for the backup files, a number of ranges among the number of computing devices 704 —— Generate and store a number of virtual data files in the number of ranges, wherein each range of the number of ranges includes one or more virtual data files of the number of virtual data files, wherein the one or more virtual data files for a respective range identify physical data configured to be stored by the respective range and one or more backup files of the number of backup files, the one or more backup files being associated with the respective range, the physical data including at least a portion of the backup data of the one or more backup files, wherein based on (i) storage of the ranges and (ii) the number of virtual data files, the number of ranges are configured to serve, based on the number of virtual data files, one or more client requests directed to the physical data configured to be stored by the ranges 706 —— Ingest, for each range of the number of ranges, the physical data configured to be stored by such range by receiving, from the external storage system, the physical data configured to be stored by such range and storing such physical data in a number of data files

FIG. 7

SYSTEMS AND METHODS FOR ONLINE RESTORE FROM BACKUP

FIELD OF TECHNOLOGY

The present disclosure relates generally to methods and systems for restoring backup data to a distributed system and more particularly, to enabling availability of backup data during restoration of a distributed system.

BACKGROUND

In some cases, relational databases can apply replication to ensure data survivability, where data is replicated among one or more computing devices ("nodes") of a group of computing devices ("cluster"). A relational database may store data within one or more ranges, where a range can include one or more key-value (KV) pairs and can be replicated among one or more nodes of the cluster. A range may be a partition of a data table ("table"), where a table may include one or more ranges. The database may receive requests (e.g., such as read or write requests originating from client devices) directed to data and/or schema objects stored by the database.

In some cases, for data survivability purposes, a copy of the data (e.g., one or more ranges) stored by a cluster of computing devices may exist as "backup data" stored among one or more computing devices of a storage system external to the cluster (referred to as an "external storage system"). In the event of a failure of at least a portion of the cluster causing unavailability of at least some of the data stored by the cluster, the backup data corresponding to the unavailable data may be sent to and restored onto the cluster. Further, when it is desirable to duplicate at least some of the data stored by the cluster, the backup data corresponding to the data to be duplicated may be sent to and restored onto the cluster. After the backup data is restored onto the cluster, the cluster can include and store all of the data that existed in the cluster at the time the backup data was generated and stored on the external storage system. Conventionally, restoration to the cluster using the backup data generally requires copying the backup data from the external storage system on which it is stored into the storage devices of the computing devices of the cluster before the backup data is available to serve requests (e.g., read or write requests). Such restoration can take considerable amounts of time when a large amount of backup data is to be copied and restored based on constraints of the external storage system, network connectivity (e.g., latency and/or bandwidth) between the external storage system and the cluster, and/or a rate at which the cluster can write the copied data to its included storage devices (e.g., non-volatile storage devices). In such cases, conventionally, the backup data remains unavailable to all requests directed to the backup data for a duration of the restore process, resulting in data unavailability and system downtime.

Accordingly, improved systems and methods for restoring backup data to a system are desired that can avoid and/or reduce the time periods of data unavailability associated with conventional data restoration techniques. Further, improved systems and methods for restoring backup data to a system are desired that can enable access to backup data during restoration of the backup data to the system.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Methods and systems for enabling availability of backup data during restoration of a distributed database system are disclosed. In one aspect, embodiments of the present disclosure feature a system for restoring a distributed database using techniques for online restore by enabling availability of backup data during restoration. According to one embodiment, the system can include an external storage system storing (i) a plurality of backup files each including backup data and (ii) one or more backup metadata files including a plurality of entries for the backup files, where each entry of the plurality of entries identifies a respective backup file of the backup files, a respective portion of a key span of the backup data of such backup file, and a size of such portion of such backup file. The system can also include a plurality of computing devices configured to perform a number of operations. The operations can include generating and storing, based on (i) the plurality of backup files and (ii) the plurality of entries of the one or more backup metadata files, a plurality of ranges among the plurality of computing devices. The operations can include generating and storing a plurality of virtual data files in the plurality of ranges, where each range of the plurality of ranges includes one or more virtual data files of the plurality of virtual data files, where the one or more virtual data files for a respective range identify physical data configured to be stored by the respective range and one or more backup files of the plurality of backup files, the one or more backup files being associated with the respective range, the physical data including at least a portion of the backup data of the one or more backup files, where based on (i) storage of the ranges and (ii) the plurality of virtual data files, the plurality of ranges are configured to serve, based on the plurality of virtual data files, one or more client requests directed to the physical data configured to be stored by the ranges. The operations can include ingesting, for each range of the plurality of ranges, the physical data configured to be stored by such range by receiving, from the external storage system, the physical data configured to be stored by such range and storing such physical data in a plurality of data files.

Various embodiments of the system can include one or more of the following features. In some variations, a first backup file of the plurality of backup files is identified by two or more entries of the plurality of entries of the one or more backup metadata files, where each entry of the two or more entries identifies a respective distinct portion of the key span of the backup data of the first backup file and a size of such distinct portion of the first backup file. In some variations, generating and storing the plurality of ranges can include determining the one or more backup files including the physical data configured to be stored by a first range of the plurality of ranges based on the sizes of the portions of such one or more backup files identified by the one or more virtual data files of the first range, and associating the one or more backup files with the first range by generating the one or more virtual data files for the first range, where a sum of the sizes of the portions of such one or more backup files identified by the one or more virtual data files is greater than a threshold size. In some variations, generating and storing the plurality of ranges can include an iterative process for (i) identifying, from a first entry of the plurality of entries of the one or more backup metadata files, the size of the portion of the respective backup file identified by the first entry, and (ii) associating the size of the portion of such backup file with a first range of the plurality of ranges by assigning to the first range an indication of the size of portion of such backup file.

In some embodiments, generating and storing the plurality of virtual data files in the plurality of ranges can further include determining, for at least one range of the ranges, a respective link timestamp at which each of the one or more virtual data files was stored in the at least one of the ranges by a computing device of the plurality of computing devices. In some variations, one or more of the plurality of computing devices can store the plurality of ranges, and generating and storing the plurality of virtual data files can further include sending, from an initiating computing device of the plurality of computing devices to a computing device of the plurality of computing devices storing a first range of the plurality of ranges, one or more requests identifying the one or more backup files associated with the first range, and generating and storing, by the computing device and based on the one or more requests, the one or more virtual data files of the first range. Each backup file of the plurality of backup files can include a plurality of data blocks. The operations can further include, for a first range of the plurality of ranges, identifying, from the one or more virtual data files of the first range, one or more data blocks of the data blocks of a backup file of the one or more backup files identified by the one or more virtual data files, where one of the data files of the first range includes the one or more data blocks. In some variations, the plurality of computing devices can store at least three replicas of each range of the plurality of ranges and each of the at least three replicas of a range of the plurality of ranges can be stored by a distinct computing device of the plurality of computing devices. In some variations, at least one computing device of the plurality of computing devices can store a first range of the plurality of ranges, the plurality of data files of the range can be and/or include a plurality of sorted string table (SST) files, the physical data configured to be stored by the first range can include one or more key-value entries each including a key and a value, and a plurality of levels of a log-structured merge (LSM) tree operated by the computing device can include the plurality of SST files.

In some variations, the operations can include, for each range of the plurality of ranges, deleting one or more virtual data files of such range based on storing the physical data configured to be stored by such range in the plurality of data files. In some variations, the operations can include causing storage, by the external storage system, of (i) the plurality of backup files and (ii) the one or more backup metadata files for the plurality of backup files. The operations can include receiving, from the external storage system, the physical data configured to be stored by a first range of the plurality of ranges, and storing a portion of the physical data configured to be stored by the first range in a non-persistent storage medium.

In some embodiments, the operations can include receiving, from a client device, a read request directed to a portion of the physical data identified by the one or more virtual data files of a first range of the plurality of ranges, sending, based on receiving the read request, a download request to the external storage system identifying the portion of the physical data identified by the one or more virtual data files, receiving, from the external storage system, one or more data blocks derived from the backup data of the one or more backup files, where the one or more data blocks includes the portion of the physical data identified by the one or more virtual data files, and serving the read request based on the one or more data blocks. The operations can include receiving, from a client device, a write request directed to a portion of the physical data identified by the one or more virtual data files of a first range of the plurality of ranges, and executing the write request by writing a new version of the portion of the physical data identified by the one or more virtual data files and storing the new version of the portion of the physical data in a non-persistent storage medium.

In some embodiments, the operations can include receiving, from a client device, a request to initiate a restore of the plurality of ranges. In some variations, the operations can include generating, by a first computing device of the plurality of computing devices storing a first range of the plurality of ranges, a snapshot of the first range identifying the data included in the first range, where the snapshot includes one or more second virtual data files generated based on (e.g., copied from) the one or more virtual data files of the first range, sending, from the first computing device to a second computing device of the plurality of computing devices, the snapshot of the first range, and storing, by the second computing device, the one or more second virtual data files.

In some embodiments, (i) the plurality of backup files can be or include a plurality of backup sorted string table (SST) files, (ii) the backup data can include a plurality of key-value entries each including a key and a value, and (iii) for each backup file, the key span of the respective entry of the plurality of entries identifying such backup file can include a segment (e.g., distinct segment) of a permissible key space spanned by the plurality of key-value entries of the backup data of such backup file. In some variations, each key-value entry of the plurality of key-value entries (e.g., of the backup data) can include a timestamp at which the key-value entry was written to at least one of the plurality of computing devices prior to storage of the corresponding backup file (e.g., including such key entry) stored at the external storage system. In some variations, at least one of the requests identifying the one or more backup files associated with the first range can include (i) an identifier of a first backup file of the one or more backup files associated with the first range, (ii) the respective portion of the key span of the backup data of the first backup file, (iii) a prefix synthesis rule, and (iv) a write timestamp (e.g., link timestamp) for the first backup file. In some variations, the one or more data blocks can include three or more data blocks, where the three or more data blocks can include a starting data block, an ending data block, and one or more intermediate data blocks spanning between the starting data block and the ending data block. In some variations, the operations can include generating an index block identifying one or more positions of the one or more data blocks within the one of the data files. In some variations, each key-value entry of the one or more key-value entries (e.g., stored by the data files) of the first range includes a link timestamp at which the one or more virtual data files of the first range were stored by a computing device of the plurality of computing devices.

In some embodiments, storing the physical data in a plurality of data files for the first range can further include writing, based on the portion of the physical data stored in the non-persistent storage medium, a first data file of the plurality of data files to a top level of a plurality of levels of a log-structured merge (LSM) tree stored in a persistent storage medium, the first data file including the portion of the physical data, and deleting the portion of the physical data stored in the non-persistent storage medium. In some variations, storing the physical data in a plurality of data files can further include writing, based on the first data file, a second data file of the plurality of data files to a lower level of the plurality of levels of the LSM tree, where the second data file includes the first data file, and deleting the first data file from the top level of the LSM tree. In some variations, the operations can include identifying, from a block cache, the portion of the physical data identified by the one or more virtual data files, and serving the read request based on the block cache.

In some embodiments, the system can include corresponding computer systems (e.g., servers), apparatus, and computer programs recorded on one or more computer storage devices, each configured to perform the actions of a method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 7 shows an exemplary flowchart of a method for online restore of one or more ranges of a database from backup, according to some embodiments.

Figure 1A:
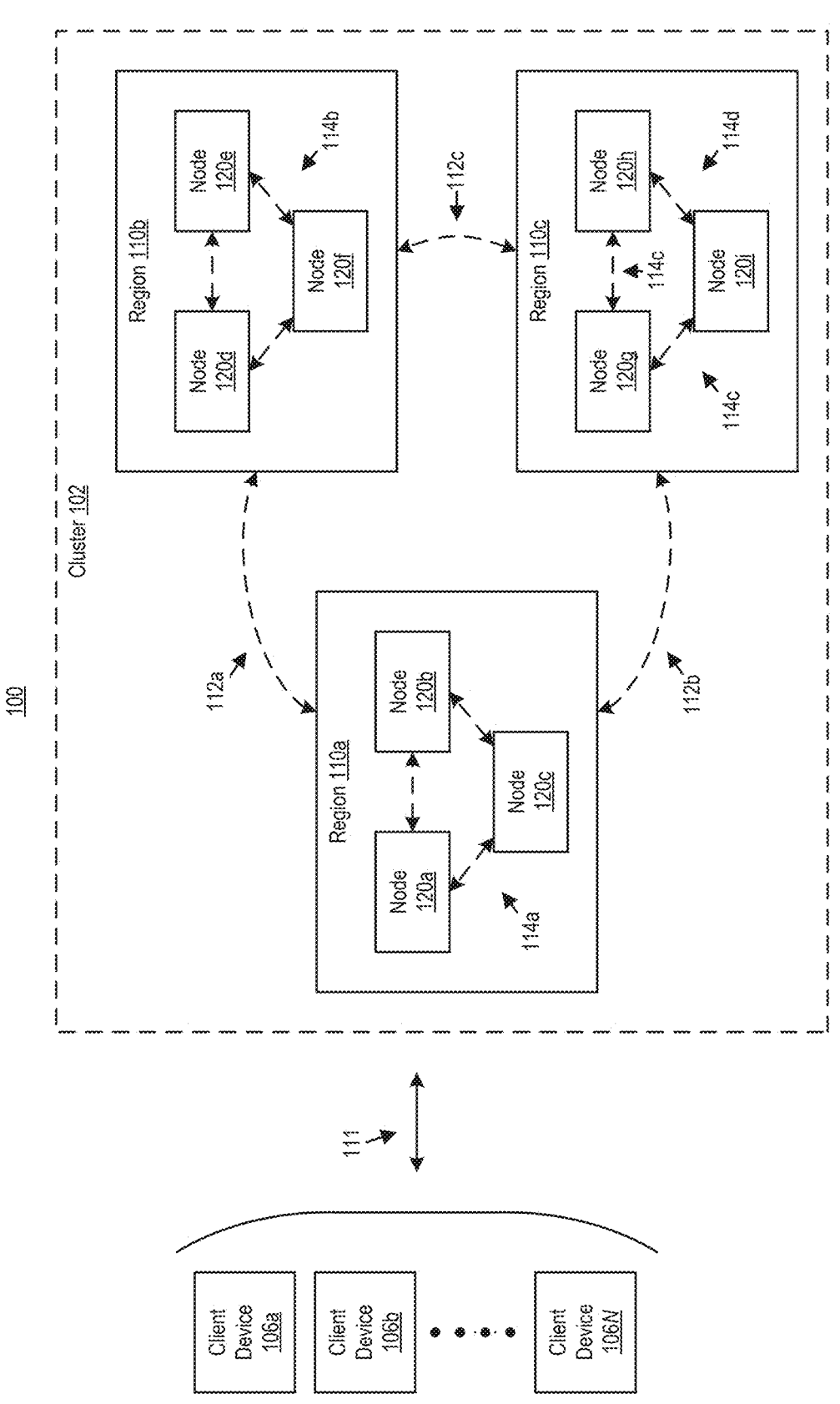
FIG. 1A ("FIG. 1A") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for enabling availability of backup data during restoration of a distributed database system are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

In some embodiments, as described herein, a database stored by a cluster of nodes may store data (e.g., KV data) within a number of ranges. At an individual node storing one or more of the ranges, the data forming the ranges is stored within a log-structured merge (LSM) tree. An LSM tree is a hierarchical data storage tree including a number of levels that maintain organization of data (e.g., KV data) of the ranges stored by the node. For each level of the LSM tree, one or more (e.g., a number of) files may be stored on persistent, non-volatile storage media (e.g., disk storage, solid state drive (SSD) storage, etc.) that include the data referenced at that respective level. The files may be sorted string table files (also referred to as "sstables", "SSTs" or "SST files"). In some cases, SST files are an on-disk (e.g., on persistent, non-volatile storage such as disk storage, SSD storage, etc.) representation of sorted lists of KV pairs included in the range(s) stored by the node. SST files can be immutable, such that they are not modified (e.g., even during a compaction process) and instead are deleted and written. Data forming a range can be stored among one or more SST files and a particular SST file can store data (e.g., KV pairs) included in one or more ranges.

As described above, for data survivability purposes, backup data stored among one or more computing devices of an external storage system can exist as a point-in-time copy of data (e.g., ranges) stored by a cluster of a computing devices. The backup data may exist on one or more computing devices of the external storage system as a number of SST files that are based on the data of the SST files stored by the cluster, such that the cluster and the external storage system store data of a same format. When a portion of the cluster fails and causes unavailability of at least some of the data (e.g., range(s) and included SST file(s)) stored by the cluster, the backup data (e.g., backup SST file(s)) corresponding to the unavailable data may be copied from the external storage system, sent to the cluster, and restored onto the cluster, thereby replacing the unavailable data within the one or more ranges. Conventionally, during restoration of the backup data to replace the unavailable data, none of the backup data is available to serve requests (e.g., read or write requests) directed to the backup data until the backup data is restored onto the cluster, thereby resulting in time periods where data is unavailable for access (e.g., by client devices).

Accordingly, improved systems and methods for "online restore" are provided that enable access to and availability of backup data while the backup data is copied from an external storage system to a cluster to replace unavailable data. Such techniques remedy the deficiencies of conventional restore processes by enabling access to backup data intended to replace unavailable data before the backup data is restored onto the cluster. Using the improved techniques described herein, read requests directed to unavailable data can be served and executed by reading backup data as needed directly from the external storage system while the backup data is copied from the external storage system to the cluster. Thus, the techniques for online restore described herein substantially reduce time periods where data is unavailable to serve requests, as the cluster can serve received requests (e.g., originating from client devices) directed to backup data immediately after restoration of backup data to the cluster is initiated.

In some embodiments, to enable availability of backup data for serving requests before the backup data is restored onto the cluster, hybrid storage techniques are introduced that cause generation and storage of virtual SST files among nodes of the cluster, where the virtual SST files stored on the nodes of the cluster identify and point to backup SST files stored by the external storage system. The virtual SST files may be generated to enable availability of the data of one or more ranges in place of unavailable SST files of the range(s) that were stored by the cluster. The virtual SST files may be generated based on identification of a failure and/or an unavailability of one or more nodes of the cluster that stored the ranges having data stored by the unavailable SST files. Accordingly, requests originally directed to range(s) having unavailable SST files may be redirected to newly generated ranges to which the virtual SST files are added, which then point to, access, and read from the backup SST files stored by the external storage system to serve the requests while the backup SST files are copied to and stored by the nodes of the cluster.

In some embodiments, the backup SST files may be slower to read from (e.g., due to being stored by the external storage system) than SST files stored locally by the cluster. Further, access to the backup SST files may incur expenses when the external storage system is a paid external storage service and such an external storage service may be unreliable. Accordingly, after generation and storage of the virtual SST files among nodes of the cluster to enable availability of one or more ranges, the backup SST files may be copied from the external storage system to the nodes of the cluster to replace the virtual SST files of the ranges with locally stored SST files. In a conventional restore operation, copying the backup data to the nodes of the cluster would be required to complete before the backup data is available for access. Using the techniques described herein for online restore, backup SST files are made available to range(s) (e.g., via the virtual SST files) before and while the backup SST files are copied from the external storage system and stored on the nodes of the cluster, such that read requests are transparently sent from range(s) storing virtual SST files to read the backup SST files at the external storage system until the backup SST files are copied to the nodes of the cluster. After the backup SST files are copied from the external storage system and stored by the nodes of the cluster, the cluster can switch to route received requests to the locally restored SST files instead of to the backup SST files stored by the external storage system.

To enable techniques for reading backup data during restoration to the cluster, a type of data stored by the cluster may be the same as a type of the backup data stored by the external storage system. For example, both the cluster and the external storage system may store KV data among in SST table files. Further, a storage layer of the cluster can automatically merge the content of the externally-stored, backup SST files and locally stored SST files to provide a consistent view of the data readable via the cluster, regardless of whether the data is stored by the cluster or the external storage system. Additional features of SST files and virtual SST files are described further herein.

Terms

"Cluster" generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices that are located in both the eastern United States and western United States, with 2 data centers in the eastern United States and 4 data centers in the western United States.

"Node" generally refers to an individual computing device (e.g., server) that is a part of a cluster. A node may join with one or more other nodes to form a cluster. One or more nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard", "tablet", and/or "partition". A table and its secondary indexes can be mapped to one or more ranges, where each KV pair in a range may represent a single row in the table (which can also be referred to as the primary index based on the table being sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a "primary index") for the primary key column(s). A primary key may be defined for each table stored by a database as described herein. An example of a second type of index may be a "secondary index". A secondary index may be defined on non-primary key columns of a table. A table that does not include a defined primary index may include a hidden row identifier (ID) (e.g., referred to as rowid) column that uniquely identifies each row of the table as an implicit primary index.

"Replica" generally refers to a copy of a range. A range may be replicated at least a threshold number of times to produce a number of replicas. For example and by default, a range may be replicated 3 times as 3 distinct replicas. Each replica of a range may be stored on a distinct node of a cluster. For example, 3 replicas of a range may each be stored on a different node of a cluster. In some cases, a range may be required to be replicated a minimum of 3 times to produce at least 3 replicas. In some cases, ranges may be replicated based on data survivability preferences as described further in U.S. patent application Ser. No. 17/978,752 and U.S. patent application Ser. No. 18/365,888, which are hereby incorporated by reference herein in their entireties.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read requests of read transactions and may serve the read requests to transaction coordinators operating on gateway nodes that received the read transactions by providing read KVs to the transaction coordinators, such that the transaction coordinators can send the read KVs to client devices from which the read transactions originate. Other replicas of the range that are not the leaseholder may receive read requests and may send (e.g., route) the read requests to the leaseholder, such that the leaseholder can serve the read requests based on the read transaction.

"Raft group" or "consensus group" generally refers to a group of the replicas for a particular range. The consensus group may only include voting replicas for the range and the consensus group may participate in a distributed consensus protocol and include operations as described herein.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write requests corresponding to transactions from the leader replica. The leader replica and the follower replicas of a range may constitute voting replicas that participate in a distributed consensus protocol and included operations (also referred to as "Raft protocol" and "Raft operations") as described herein.

"Raft log" and "write log" generally refers to a time-ordered log of log entries indicative of write requests (e.g., included in transactions) to a range, where the log of log entries indicate write requests and the included updates to a state of the range agreed to by at least a threshold number of the replicas of the range. Each replica of a range may include a Raft log stored on the node that stores the replica. A Raft log for a replica may be stored on persistent storage (e.g., non-volatile storage such as disk storage, solid state drive (SSD) storage, etc.). A Raft log may be a source of truth for replication among nodes for a range. Each log entry included in the Raft log may be ordered based on a timestamp at which the log entry was added to the Raft log, such that application order of the updates to each replica is the same for each replica of the range.

"Consistency" generally refers to causality and the ordering of transactions within a distributed system. Consistency defines rules for operations within the distributed system, such that data stored by the system will remain consistent with respect to read and write requests originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations (e.g., requests) that may operate on the distributed KV store.

In some embodiments, as described herein, the KV store of the database may be comprised of one or more ranges. A range may be a selected storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction including at least one read request from a client device. A node may receive a write transaction including at least one write request from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read transaction or write transaction that it cannot directly serve, the node may send and/or otherwise route the transaction to the node that can serve the transaction.

In some embodiments, modifications to the data of a range may rely on a consensus protocol (e.g., a Raft protocol) to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node (e.g., at the timestamp indicated by the clock when the transaction was received by the gateway node). The transaction may assign the timestamp to the KVs that are subject to (e.g., modified by) the transaction. Timestamps may enable tracking of versions of KVs (e.g., through MVCC as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus protocol (e.g., consensus algorithm). The storage layer may commit writes from the Raft log to disk storage (e.g., a non-volatile, persistent computer-readable storage medium on a node), as well as return requested data (e.g., read data) to the replication layer.

In some embodiments, the transaction layer may enable ACID semantics for transactions within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a key may have a different timestamp, such that no versions of the key can have the same timestamp.

Transaction Layer

In some embodiments, the database architecture for a database stored by a cluster (e.g., cluster 102) of nodes may include a transaction layer. The transaction layer may enable ACID semantics for transactions within the database. The transaction layer may receive binary KV operations from the SQL layer and control KV operations sent to a distribution layer. In some cases, a storage layer of the database may use MVCC to maintain multiple versions of keys and values mapped to the keys stored in ranges of the cluster. For example, each key stored in a range may have a stored MVCC history including respective versions of the key, values for the versions of the key, and/or timestamps at which the respective versions were written and/or committed. Each version of a key may have a different timestamp, such that no versions of the key can have the same timestamp.

In some embodiments, for write transactions, the transaction layer may generate one or more locks. A lock may represent a provisional, uncommitted state for a particular value of a KV pair. The lock may be written as part of a write request of the write transaction. The database architecture described herein may include multiple lock types. In some cases, the transactional layer may generate unreplicated locks, which may be stored in an in-memory lock table (e.g., stored by volatile, non-persistent storage of a node) that is specific to the node storing the replica on which the write transaction executes. An unreplicated lock may not be replicated other replicas based on a consensus protocol as described herein. In other cases, the transactional layer may generate one or more replicated locks (referred to as "intents" or "write intents"). An intent may be a persistent, provisional value written by a transaction before the transaction commits that is stored in persistent storage (e.g., non-volatile storage such as disk storage, SSD storage, etc.) of nodes of the cluster. Each KV write performed by a transaction can initially be an intent, which includes a provisional version and a reference to the transaction's corresponding transaction record. An intent may differ from a committed value by including a pointer to a transaction record of a transaction that wrote the intent. In some cases, the intent functions as an exclusive lock on the KV data of the replica stored on the node on which the write request of the write transaction executes, thereby preventing conflicting read and write requests having timestamps greater than or equal to a timestamp corresponding to the intent (e.g., the timestamp assigned to the transaction when the intent was written). An intent may be replicated to other nodes of the cluster storing a replica of the range based on the consensus protocol as described herein. An intent for a particular key may be included in an MVCC history corresponding to the key, such that a reader of the key can distinguish the intent from other versions of committed MVCC values stored in persistent storage for the key.

In some embodiments, each transaction directed to the cluster may have a unique replicated KV pair (referred to as a "transaction record") stored on a range stored by the cluster. The transaction for a record may be added and stored in a replica of a range on which a first write request of the write transaction occurs. The transaction record for a particular transaction may store metadata corresponding to the transaction. The metadata may include an indication of a status of a transaction and a unique identifier (ID) corresponding to the transaction. The status of a transaction may be one of: "pending" (also referred to as "PENDING"), staging (also referred to as "STAGING"), "committed" (also referred to as "COMMITTED"), or "aborted" (also referred to as "ABORTED") as described herein. A pending state may indicate that the transaction is in progress. A staging state may be used to enable a parallel commit protocol. A committed state may indicate that the transaction has committed and the write intents written by the transaction have been recorded by follower replicas. An aborted state may indicate the write transaction has been aborted and the values (e.g., values written to the range) associated with the write transaction may be discarded and/or otherwise dropped from the range. As write intents are generated by the transaction layer as a part of one or more write requests of a write transaction, the transaction layer may check for newer (e.g., more recent) committed values at the KVs of the range on which the write transaction is operating. If newer committed values exist at the KVs of the range, the write transaction may be restarted. Alternatively, if the write transaction identifies write intents at the KVs of the range, the write transaction may proceed as a transaction conflict as to be described herein. The transaction record may be addressable using the transaction's unique ID, such that requests can query and read a transaction's record using the transaction's ID.

In some embodiments, for read transactions, the transaction layer may execute a read transaction for KVs of a range indicated by the read transaction. The transaction layer may execute the read transaction if the read transaction is not aborted. The read transaction may read MVCC values at the KVs of the range. Alternatively, the read transaction may read intents written at the KVs, such that the read transaction may proceed as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternatively, the transaction layer may determine the transaction record to indicate the state as pending or staging. Based on the transaction record indicating the write transaction is in a pending state, the transaction layer may set the transaction record to staging and determine whether the write intents of the write transaction have succeeded (e.g., succeeded by replication to the other nodes storing replicas of the range). If the write intents have succeeded, the transaction layer may report the commit of the transaction to the transaction coordinator operating at the gateway node. The gateway node may send an indication of a successful commit of the write transaction to the client device that initiated the write transaction.

In some embodiments, based on committing a write transaction, the transaction layer may cleanup the committed write transaction. A coordinating node to which the write transaction was directed may cleanup the committed write transaction via the transaction layer. A coordinating node may be a node that stores a replica of a range that is the subject of the transaction. In some cases, a coordinating node may be the gateway node for the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents written for new versions of keys by the write transaction to MVCC (e.g., committed) values by removing the pointer to the transaction record. In some cases, the coordinating node may resolve the write intents written for new versions of keys by the write transaction to MVCC (e.g., committed) values using time bound iteration to filter and avoid reading keys having timestamps less than a target timestamp or external to a target timestamp range, thereby reducing an amount of time required to resolve the write intents. Based on removing the pointer to the transaction record for the write transaction, the coordinating node may delete the write intents of the transaction. Based on the deletion of each of the write intents for the transaction, the transaction record may be deleted. Additional features for a commit protocol are described at least in U.S. patent application Ser. No. 18/316,851, which is hereby incorporated by reference herein in its entirety.

In some embodiments, the transaction layer may track timing of transactions (e.g., to maintain serializability). The transaction layer may implement HLCs to track time within the cluster. An HLC may be composed of a physical component (e.g., which may be close to local actual time) and a logical component (e.g., which is used to distinguish between events with the same physical component). HLC time may always be greater than or be equal to the actual time. Each node may include a local HLC, such that the cluster operates based on locally distributed clocks operating at individual nodes.

For a transaction having a per-transaction read snapshot scope, the gateway node (e.g., the node that initially receives a transaction) may determine a timestamp for the transaction and constituent requests (e.g., requests derived from a transaction) based on an HLC time for the node. For example, the gateway node may determine a timestamp for the transaction to be equal to an HLC time of the gateway node at which the gateway node received the transaction. For a transaction having a per-statement read snapshot scope, the gateway node (e.g., the node that initially receives a transaction) may determine a timestamp for each received statement of the transaction and constituent requests of each statement based on an HLC time for the node. For example, the gateway node may determine a timestamp for a statement of the transaction to be equal to an HLC time of the gateway node at which the gateway received the statement of the transaction. The transaction layer may enable transaction timestamps based on HLC time. A timestamp within the cluster may be used to track versions of KVs (e.g., through MVCC as to be described herein) and provide guaranteed transactional isolation. A timestamp for a write intent as described herein may be equal to the assigned timestamp of a transaction corresponding to the write intent when the write intent was written to storage. A timestamp for a write intent corresponding to a transaction may be less than or equal to a commit timestamp for a transaction. When a timestamp for a write intent is less than a commit timestamp for the transaction that wrote the write intent (e.g., based on advancing the commit timestamp due to a transaction conflict or a most-recent timestamp indicated by a timestamp data structure), during asynchronous intent resolution, the committed, MVCC version of the write intent may have its respective timestamp advanced to be equal to the commit timestamp of the transaction.

For a transaction, for a node sending a request for the transaction to another node, the node may include the timestamp for the request that was generated by the local HLC (e.g., the HLC of the node) with the sent request. Based on receiving a request from another node (e.g., sender node), a node (e.g., receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve read requests for data stored by the leaseholder, where the read requests of the read transaction that reads the data having an HLC timestamp greater than or equal to the HLC timestamp of the MVCC value read by the read transaction (e.g., such that the read occurs after the write).

To provide isolation within the cluster, based on a transaction reading a value of a range via a read request, the transaction layer may store the transaction request's timestamp in a timestamp data structure (e.g., timestamp cache) stored at the leaseholder replica of the range. For each read request directed to a range, the timestamp cache may record and include an indication of the latest timestamp (e.g., the timestamp that is the furthest ahead in time) at which value(s) of the range that were read by a read request of a transaction. Based on execution of a write transaction, the transaction layer may compare the timestamp of the write transaction to the latest timestamp indicated by the timestamp cache. If the timestamp of the write transaction is less than the latest timestamp indicated by the timestamp cache, the transaction layer may attempt to advance the timestamp of the write transaction forward to a new, later timestamp that is greater than the latest timestamp indicated by the timestamp cache. In some cases, advancing the timestamp may cause the write transaction to restart in the second phase of the transaction as to be described herein with respect to read refreshing.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a transaction coordinator. The transaction coordinator may perform one or more operations as a part of the transaction layer. Based on the execution of a transaction, the transaction coordinator may send (e.g., periodically send) "heartbeat" messages to a transaction record for the transaction. These messages may indicate that the transaction should keep executing (e.g., be kept alive). If the transaction coordinator fails to send the "heartbeat" messages, the transaction layer may modify the transaction record for the transaction to an aborted status. The transaction coordinator may track each written KV and/or written span of KVs during execution of a transaction. In some embodiments, the transaction coordinator may clean and/or otherwise clear accumulated transaction operations. The transaction coordinator may clear an accumulated write intent for a write transaction based on the status of the transaction changing to committed or aborted.

As described herein, to track the status of a transaction during execution, the transaction layer can write to a transaction record corresponding to the transaction. Write intents of the transaction may route conflicting transactions to the transaction record based on the pointer to the transaction record included in the write intents, such that the conflicting transaction may determine a status for conflicting write intents as indicated in the transaction record. The transaction layer may write a transaction record to the same range as the first key subject to a transaction. The transaction coordinator may track the first key subject to a transaction. In some cases, the transaction layer may generate the transaction record when one of the following occurs: the write request commits; the transaction coordinator sends heartbeat messages for the transaction; or a request forces the transaction to abort. As described herein, a transaction record may have one of the following states: pending, committed, staging, or aborted. In some cases, the transaction record may not exist. If a transaction encounters a write intent where a transaction record corresponding to the write intent does not exist, the transaction may use the timestamp of the write intent to determine how to proceed with respect to the observed write intent. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration configured based on a time period for sending "heartbeat" messages. For example, the transaction liveness threshold may be a duration lasting for five "heartbeat" message time periods, such that after five missed heartbeat messages, a transaction may be aborted. The transaction record for a committed transaction may remain until each of the write intents of the transaction are converted to committed MVCC values stored on persistent storage of a node.

As described herein, in the transaction layer, values may not be written directly to the storage layer as committed MVCC values during a write transaction. Values may be written in a provisional (e.g., uncommitted) state referred to as a write intent. Write intents may be MVCC values including a pointer to a transaction record to which the MVCC value belongs. Based on interacting with a write intent (instead of a committed MVCC value), a request may determine the status of the transaction record, such that the request may determine how to interpret the write intent. As described herein, if a transaction record is not found for a write intent, the request may determine the timestamp of the write intent to evaluate whether or not the write intent may be considered to be expired.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be referred to as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory (e.g., stored by volatile, non-persistent storage) data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (e.g., requests originating from statements of transactions) to acquire locks, where the locks may exist for durations longer than the duration of the requests themselves. The locks may extend the duration of the isolation provided over specific keys of ranges stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed to execute. The concurrency manager may include information for external locks (e.g., the write intents).

In some embodiments, one or more locks may not be controlled by the concurrency manager, such that one or more locks may not be discovered during sequencing. As an example, write intents (e.g., replicated, exclusive locks) may be stored such that that may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica on which the first write request of a transaction occurred may contain the transaction record.

As described herein, databases stored by the cluster may be read and written using one or more "requests". A transaction may be composed of one or more statements (e.g., SQL statements), where each statement includes one or more requests, such as read requests and write requests. A read request may be a request to read data stored by a range, such as a value of a particular key at a timestamp corresponding to the request. A write request may be a request to write (e.g., update or modify) data stored by a range, such that the write request writes a value for a key included in the range. For example, a write request may write a value for a new version of a key. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, locks may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests R1 and R2 contend on key K2, but R1 is also waiting at key K1, R2 may be determined to have priority over R1, such that R2 may be executed on K2.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may serialize write requests for the range. Serializing the requests may group the requests into a consistent order. To enforce the serialization, the lease-holder may create a "latch" for the keys in the write value, such that a write request may be given uncontested access to the keys. If other requests access the leaseholder for the same set of keys as the previous write request, the other requests may wait for the latch to be released before pro-ceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transac-tions if serializability violations are possible. In some embodiments, the transaction layer may execute transactions at an isolation level different from a serializable isolation level. In some cases, the transaction layer may execute transactions at other isolation levels, such as a read com-mitted isolation level and a snapshot isolation level.

In some embodiments, the transaction layer may allow for one or more transaction conflict types, where a conflict type may result from a transaction encountering and/or otherwise interacting with a write intent at a key (e.g., at least one key). A write/write conflict may occur when two concurrent transactions attempt to write to (e.g., create write intents for) the same key. A write/read conflict may occur when a read request of a transaction encounters an existing write intent with a timestamp less than or equal to the timestamp of the read request. To resolve the transaction conflict, the trans-action layer may proceed through one or more operations. Based on a transaction within the transaction conflict having a defined transaction priority (e.g., high priority, low prior-ity, etc.), the transaction layer may abort the transaction with lower priority (e.g., in a write/write conflict) or advance the timestamp of the transaction having a lower priority (e.g., in a write/read conflict). Based on a transaction within the conflicting transactions being expired, the expired transac-tion may be aborted. A transaction may be considered to be expired if the transaction does not have a transaction record or the timestamp for the transaction is outside of the trans-action liveness threshold. A transaction may be considered to be expired if the transaction record corresponding to the transaction has not received a "heartbeat" message from the transaction coordinator within the transaction liveness threshold. A transaction (e.g., a low priority transaction) that is required to wait on a conflicting transaction may enter the TWQ as described herein.

In some embodiments, the transaction layer may allow for one or more additional conflict types that do not involve write intents. A read/write conflict (also referred to herein as a "write after read conflict") may occur when a write transaction having a lower timestamp conflicts with a read transaction having an equal or higher timestamp. The time-stamp of the write transaction may be advanced to be greater than the timestamp of the read transaction, such that the write transaction may execute. A read within an uncertainty interval (also referred to as an "uncertainty window") may occur when a read transaction encounters a KV having a higher timestamp than the timestamp of the read transaction and there exists ambiguity whether the KV should be considered to be committed in the future or in the past of the read transaction. An uncertainty interval may be configured based on the maximum allowed offset (e.g., maximum allowed difference in time) between the clocks (e.g., HLCs)

of any two nodes within the cluster. In an example, a duration of the uncertainty interval may be equal to the maximum allowed offset, where the uncertainty interval is defined as $(t, t+d]$, where t refers to the initial timestamp of the read transaction and d refers to the duration of the uncertainty interval. A read within an uncertainty interval may occur based on clock skew between clocks operating on different nodes. In some cases, the transaction layer may advance the timestamp of the read transaction to be greater than the timestamp of the KV according to read refreshing as described herein. If the read transaction associated with a read within an uncertainty interval has to be aborted and retried, the read transaction may never encounter an uncer-tainty interval on any node which was previously visited by the read transaction. In some cases, there may not exist an uncertainty interval for KVs read from the gateway node of the read transaction. An amount of work to be aborted and retried may depend on a read snapshot scope and corre-sponding isolation level for a transaction. A first transaction that adheres to an isolation level having a per-statement read snapshot scope may only be required to abort and retry an individual statement of the first transaction while a second transaction that adheres to an isolation level having a per-transaction read snapshot scope may be required to abort and retry all statements of the transaction. When a first transaction adheres to an isolation level having a per-statement read snapshot scope, an amount of work aborted and retried by the first transaction may be relatively less work than a second transaction that adheres to an isolation level having a per-transaction read snapshot scope.

In some embodiments, as described herein, the TWQ may track all transactions that could not advance another block-ing, ongoing transaction that wrote write intents observed by the tracked transactions. The transactions tracked by the TWQ may be queued and may wait for the blocking trans-action to complete before the transaction can proceed to execute. The structure of the TWQ may map a blocking transaction to the one or more other transactions that are blocked by the blocking transaction via the respective unique IDs corresponding to each of the transactions. The TWQ may operate on the leader replica of a range, where the leader replica includes the transaction record based on being subject to the first write request included in the blocking, ongoing transaction. Based on a blocking transaction resolv-ing (e.g., by committing or aborting), an indication may be sent to the TWQ that indicates the queued transactions blocked by the blocking transaction may begin to execute. A blocked transaction (e.g., a transaction blocked by a block-ing transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by second write intents of a second transaction and the second transaction may be blocked by first write intents of the first transaction. If transactions are deadlocked (e.g., blocked on write intents of another transaction), one of the deadlocked transactions may randomly abort, such that the remaining, active (e.g., alive) transaction may execute and the deadlock may be removed. A deadlock detection mecha-nism may identify whether transactions are deadlocked and may cause one of the deadlocked transactions to abort.

In some embodiments, the transaction layer may enable read refreshing. When a timestamp of a transaction has been advanced to a new, later timestamp, additional consider-ations may be required before the transaction may commit at the advanced timestamp. The considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit at the advanced timestamp. A transaction may perform the check at a commit time if the transaction was advanced by a different transaction or by the timestamp cache. A transaction may perform the check based on encountering a read within an uncertainty interval or a write/write conflict. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leaseholders (e.g., combined leaseholder and leader replicas) to follower replicas in parallel, such that waiting for a commit occurs at transaction commit time. Transaction pipelining may include one or more operations. In transaction pipelining, for each received statement (e.g., including one or more requests) of a transaction, the gateway node corresponding to the transaction may communicate with the leaseholders $(L_1, L_2, L_3, \ldots, L_i)$ for the range(s) indicated by the transaction. Each leaseholder $L_i$ may receive the communication from the gateway node and may perform one or more operations in parallel. Each leaseholder $L_i$ may (i) create write intents, and (ii) send the write intents to corresponding follower nodes for the leaseholder $L_i$. After sending the write intents to the corresponding follower nodes, each leaseholder $L_i$ may send an indication to the transaction coordinator on the gateway node that the write intents have been sent. Replication of the intents may be referred to as "in-flight" once the leaseholder $L_i$ sends the write intents to the follower replicas. Before committing the transaction (e.g., by updating the transaction record for the transaction via a transaction coordinator), the gateway node may wait for the write intents to be replicated in parallel to each of the follower nodes of the leaseholders. Based on receiving responses from the leaseholders that the write intents have propagated to the follower nodes, the gateway node may commit the transaction by causing an update to the status of the transaction record of the transaction. Additional features of distributed consensus (e.g., Raft) operations are described with respect to "Transaction Execution".

Database Architecture

Referring to FIG. 1A, an illustrative distributed computing system 100 is presented. The computing system 100 may include a cluster 102. In some cases, the computing system may include one or more additional clusters 102 (not shown in FIG. 1A). The cluster 102 may include one or more nodes 120 distributed among one or more geographic regions 110. The geographic regions may correspond to cluster regions and database regions as described further below. A node 120 may be a computing device (e.g., a server computing device). In some cases, a node 120 may include at least portions of the computing system as described herein with respect to FIG. 8. As an example, a node 120 may be a server computing device. A node may store replicas of one or more ranges, where one or more SST files stored by the node 120 include the data (e.g., KV data) of the range. A region 110 may correspond to a particular building (e.g., a data center), city, state/province, country, geographic region, and/or a subset of any one of the above. In some cases, each region 110 may be a distinct geographic region. A region 110 may include multiple elements, such as a country and a geographic identifier for the country. For example, a region 110 may be indicated by Country=United States and Region=Central, which may indicate a region 110 as the Central United States. As shown in FIG. 1A, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN), wide area network (WAN), and/or any other suitable network. In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN, WAN, and/or any other suitable network. In some cases, the networks 114 may connect nodes 120 within a region 110. The nodes 120a, 120b, and 120c of the region 110a may be interconnected via a network 114a. The nodes 120d, 120c, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 8. In an example, the one or more client devices 106 may include laptop computing devices, desktop computing devices, mobile computing devices, tablet computing devices, and/or server computing device. As shown in FIG. 1A, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client (e.g., an application) operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster. In some cases, one or more applications may operate on the client devices 106, such that the application(s) may interface with the nodes 120 to access, modify, and/or retrieve stored KV data.

Figure 1B:
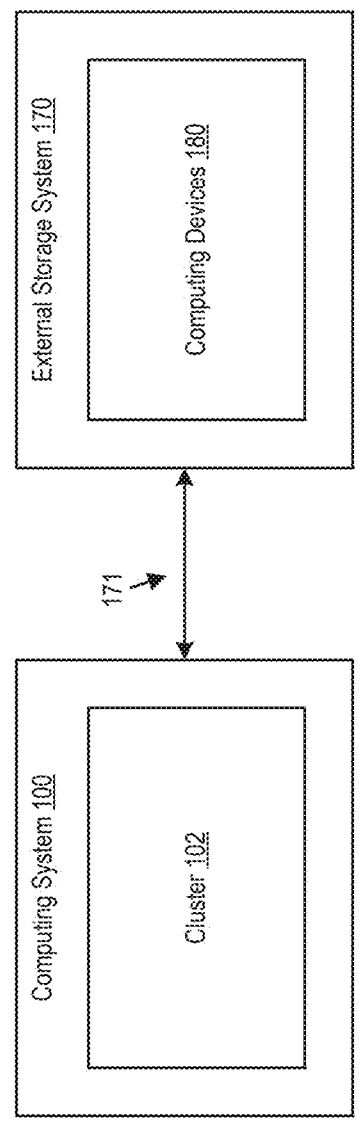
FIG. 1B shows an illustrative distributed computing system and external storage system, according to some embodiments.

Referring to FIG. 1B, the computing system 100 and an external storage system 170 are illustrated. The external storage system 170 may be distinct from the computing system 100 and may include one or more computing devices 180. As an example, the external storage system may include a number of computing devices. A computing device 180 may be a server computing device including one or more storage devices for storing a copy of at least a portion of the data (e.g., KV data stored by the cluster 102). In some cases, a computing device 180 may include at least portions of the computing system as described herein with respect to FIG. 8.

Each computing device 180 may be communicatively coupled via one or more networks (not shown in FIG. 1B). The network(s) that communicatively couple the computing devices 180 may include a local area network (LAN), wide area network (WAN), and/or any other suitable network. In some cases, the computing system 100 may be communicatively connected to the external storage system by one or more networks 171. The network(s) 171 that communicatively couple the computing devices 180 may include a local area network (LAN), wide area network (WAN), and/or any other suitable network. The one or more network(s) may enable communications between the computing device(s) 180 of the external storage system 170 and the at least the nodes 120 of the cluster 102.

In some embodiments, for data survivability purposes, the cluster 102 may read and generate a copy of the data of the SST files forming the ranges stored by one or more of (e.g., all of) the nodes 120 and send the copied data to the computing device(s) 180 of the external storage system 170 for storage. The computing device(s) 180 of the external storage system 170 may receive the copied data and may store the copied data as SST files (referred to as "backup SST files") on persistent storage (e.g., non-volatile storage such as disk storage, solid state drive (SSD) storage, etc.) of the computing device(s) 180. In some cases, the cluster 102 may periodically read and generate copies of the data of the SST files forming the ranges stored by the nodes 120 and send the copied data to the computing device(s) 180 of the external storage system 170 for storage as backup SST files. In some cases, backup SST files received from the cluster 102 and stored by the computing device(s) 180 of the external storage system 170 may include version identifiers (e.g., timestamps). In some cases, the version identifiers may include timestamps and the individual keys of the backup SST files may include timestamps assigned to the keys. As an example, the assigned timestamps may be times at which the keys of backup SST files were originally written (e.g., committed) to and stored by the nodes 120 of the cluster. Each key of the KV data of the backup SST files may have been assigned a timestamp (e.g., according to MVCC) by the cluster 102 for a time at which the key and respective value were written to and stored by a node 120 of the cluster 102.

In some embodiments, based on storage of the backup SST files, the cluster 102 may access and evaluate metadata of each of the backup SST files to identify (i) a segment of a key space of permissible keys spanned by the keys included in each of the backup SST files and (ii) a size of each of the backup SST files. In some cases, a segment of a key space spanned by keys of a particular file (e.g., SST file, backup SST file, and/or virtual SST file) may also be referred to as a "key span" of the file. In some cases, a size of a backup SST file may be a storage (e.g., byte) size of the data (e.g., index blocks, data blocks, and included KV data) included in the key span or portion thereof of the backup SST file. Based on identifying a key span of each of the backup SST files and a size of each of the backup SST files, the cluster 102 may generate one or more backup metadata files each including a number of entries. Each entry of a backup metadata file may identify a particular backup SST file of the backup SST files, the size of the backup SST file, and the key span of the backup SST file. As an example, each entry may identify 64 megabytes (MB) of data spanned by a key span or portion thereof of a backup SST file. In some cases, an entry of a backup metadata file may identify only a portion of a particular backup SST file of the backup SST files, the key span of the portion of the backup SST file, and the size of the portion of the backup SST file. Two or more entries of a backup metadata file may combine to identify the entirety of a particular backup SST file of the backup SST files by identifying the entire size of the backup SST file and the entire key span of the backup SST file, where each of the two or more entries includes metadata for a distinct portion of the backup SST file. In some cases, multiple entries of a backup metadata file may combine to identify a full size of a backup SST file and a full key span of the backup SST file. In some cases, entries of backup metadata files that identify a same backup SST file may not identify overlapping portions of the key span of the backup SST file, such that each entry identifying a particular backup SST file identifies a distinct portion of the key span of the backup SST file. Based on generating the one or more backup metadata files, the cluster 102 may cause storage of the backup metadata files on persistent storage devices of the external storage system 170 as a metadata manifest for the backup SST files.

Transaction Execution

In some embodiments, as described herein, distributed transactional databases stored by the cluster (e.g., cluster 102) of database nodes may enable one or more transactions. Each transaction may include one or more requests directed to performing one or more operations. The one or more requests may include read requests and/or write requests. In some cases, a request may be a query (e.g., a SQL query). A request may traverse one or more nodes of a cluster to execute the request. A request may interact with (e.g., sequentially interact with) one or more of the following: a SQL client, a load balancer, a gateway, a leaseholder, and/or a Raft leader as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder may be a node that serves read requests and coordinates write requests for a range of keys (e.g., keys indicated in the request) as described herein. Serving a read request may include reading, by a request, a value(s) of stored keys and sending the read values from the node on which the values were stored to the transaction coordinator for the transaction corresponding to the request, where the transaction coordinator for the transaction can operate on a gateway node that originally received the transaction (e.g., from a client device). A Raft leader may be a node that maintains consensus among the replicas for a range via coordination of a consensus protocol.

A SQL client (e.g., operating at a client device 106*a*) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120*a*) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. A transaction coordinator operating on a gateway node may perform one or more operations as a part of the transaction layer. The transaction coordinator may cause execution of KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender) operating on the gateway node.

A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (e.g., the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write requests and values for read requests corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write request in the Batch Request may compare a timestamp of the write request to the timestamp cache. A timestamp cache may track the highest timestamp (e.g., most recent timestamp) for any read request that a given range has served. The comparison may ensure that the write request has a higher timestamp than any timestamp indicated by the timestamp cache. If a write request has a lower timestamp than any timestamp indicated by the timestamp cache, the write request may be restarted at an advanced timestamp that is greater than the value of the most recent timestamp indicated by the timestamp cache.

In some embodiments, operations indicated in the Batch Request may be serialized by a latch manager of a leaseholder. For serialization, each write request may be given a latch on a row. Any read and/or write requests that arrive after the latch has been granted on the row may be required to wait for the write request to complete. Based on completion of the write request, the latch may be released and the subsequent requests can proceed to execute. In some cases, a batch evaluator may ensure that write requests are valid. The batch evaluator may determine whether the write request is valid based on the leaseholder's data. The leaseholder's data may be evaluated by the batch evaluator based on the leaseholder coordinating write requests to the range. If the batch evaluator determines the write request to be valid, the leaseholder may send a provisional acknowledgement to the DistSender of the gateway node, such that the DistSender may begin to send subsequent Batch Requests for the range to the leaseholder.

In some embodiments, requests may read from the local instance of the storage engine as described herein to determine whether write intents are present at a key. If write intents are present at a particular key, an request may resolve write intents as described herein. If the request is a read request and write intents are not present at the key, the read request may read the value at the key of the leaseholder's storage engine. Read responses corresponding to a transaction may be aggregated into a Batch Response by the leaseholder. The Batch Response may be sent to the DistSender of the gateway node. If the request is a write request and write intents are not present at the key, the KV operations included in the Batch Request that correspond to the write request may be converted to distributed consensus (e.g., Raft) operations and write intents, such that the write request may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica) have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed as described herein). The gateway node may update the status of the transaction record for the transaction corresponding to the Raft operations to committed (e.g., explicitly committed as described herein). A latency for the above-described distributed consensus round may be equal to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read request included in the Batch Request. Based on completion of the operations of the Batch Request, the DistSender may record the success of each transaction in a corresponding transaction record. To record the success of a transaction, the DistSender may check the timestamp cache of the range where the first request of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Read Transaction Execution

Figure 2A:
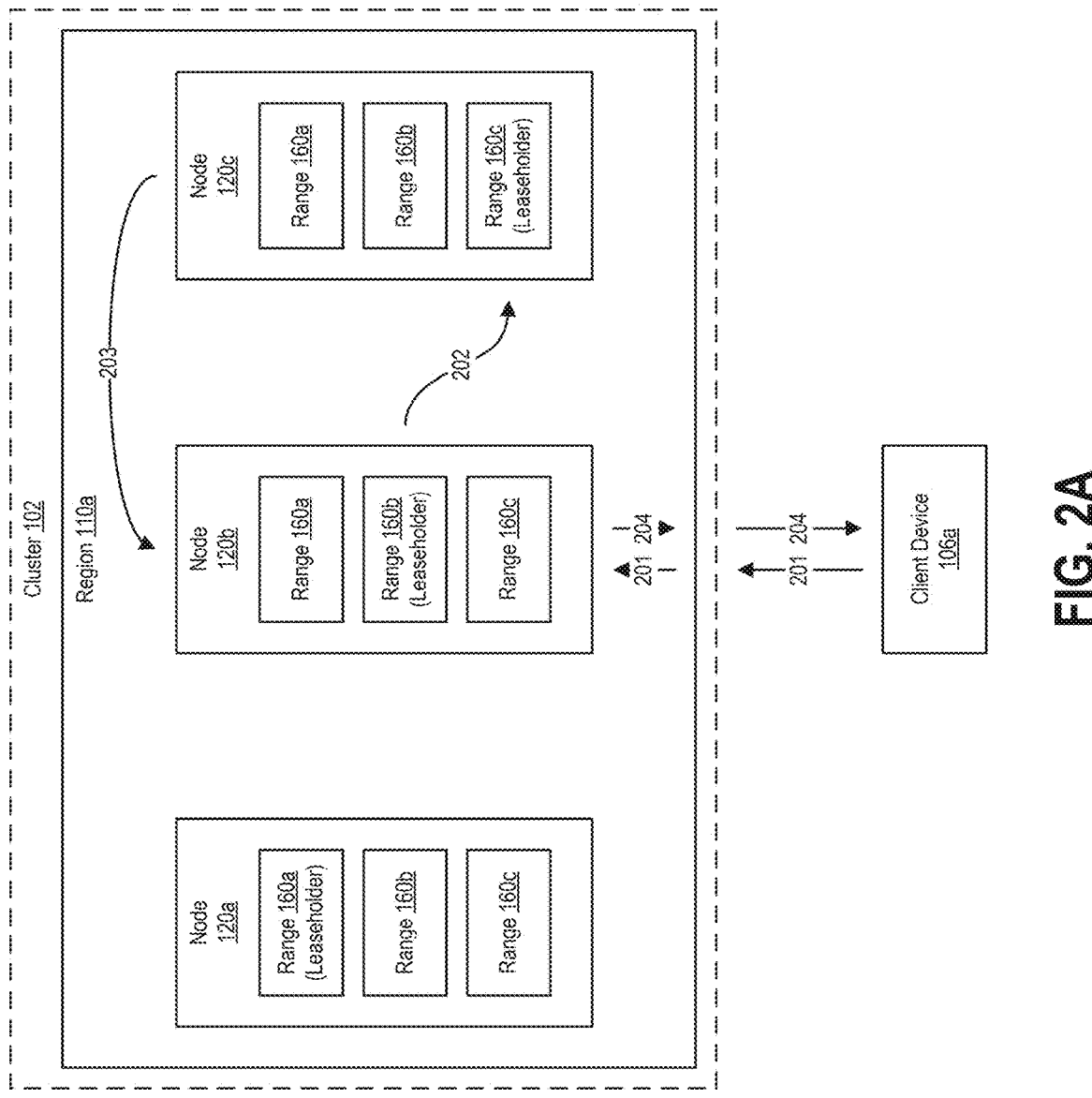
FIG. 2A shows an example of execution of a read transaction at the computing system, according to some embodiments.

Referring to FIG. 2A, an example of execution of a read transaction including at least one read request at the computing system 100 is presented. In some cases, the nodes 120a, 120b, and 120c, of region 110a may include one or more replicas of ranges 160. The node 120a may include replicas of ranges 160a, 160b, and 160c, where ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A). While FIG. 2A is described with respect to communication between nodes 120 of a single region (e.g., region 110a), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read request(s) of the read transaction to a leaseholder of the range 160 comprising the KVs indicated by the read transaction. The leaseholder of the range 160 may serve the read requests and send the read data to the gateway node. The gateway node may send the read data to the client device 106.

As shown in FIG. 2A, at step 201, the client device 106 may send a read transaction to the cluster 102. The read transaction may be received by node 120b as the gateway node. The node 120b may be a node 120 located closest to the client device 106, where the closeness between the nodes 120 and a client device 106 may correspond to a latency and/or a proximity as described herein. The read transaction may be directed to data stored by the range 160c. At step 202, the node 120b may route read request(s) of the received read transaction to node 120c. The read transaction may be routed to node 120c based on the node 120c being the leaseholder of the range 160c. The node 120c may receive the read request(s) from node 120b and serve the read request(s) from the range 160c. At step 203, the node 120c may send the read data to the node 120b. The node 120c may send the read data to node 120b based on the node 120b being the gateway node for the read transaction. The node 120b may receive the read data from node 120c. At step 204, the node 120b may send the read data to the client device 106a to complete the read transaction. If node 120b had been configured to include the leaseholder for the range 160c, the node 120b may have served the read data to the client device directly after step 201, without routing the read request(s) of the read transaction to the node 120c.

Write Transaction Execution

Figure 2B:
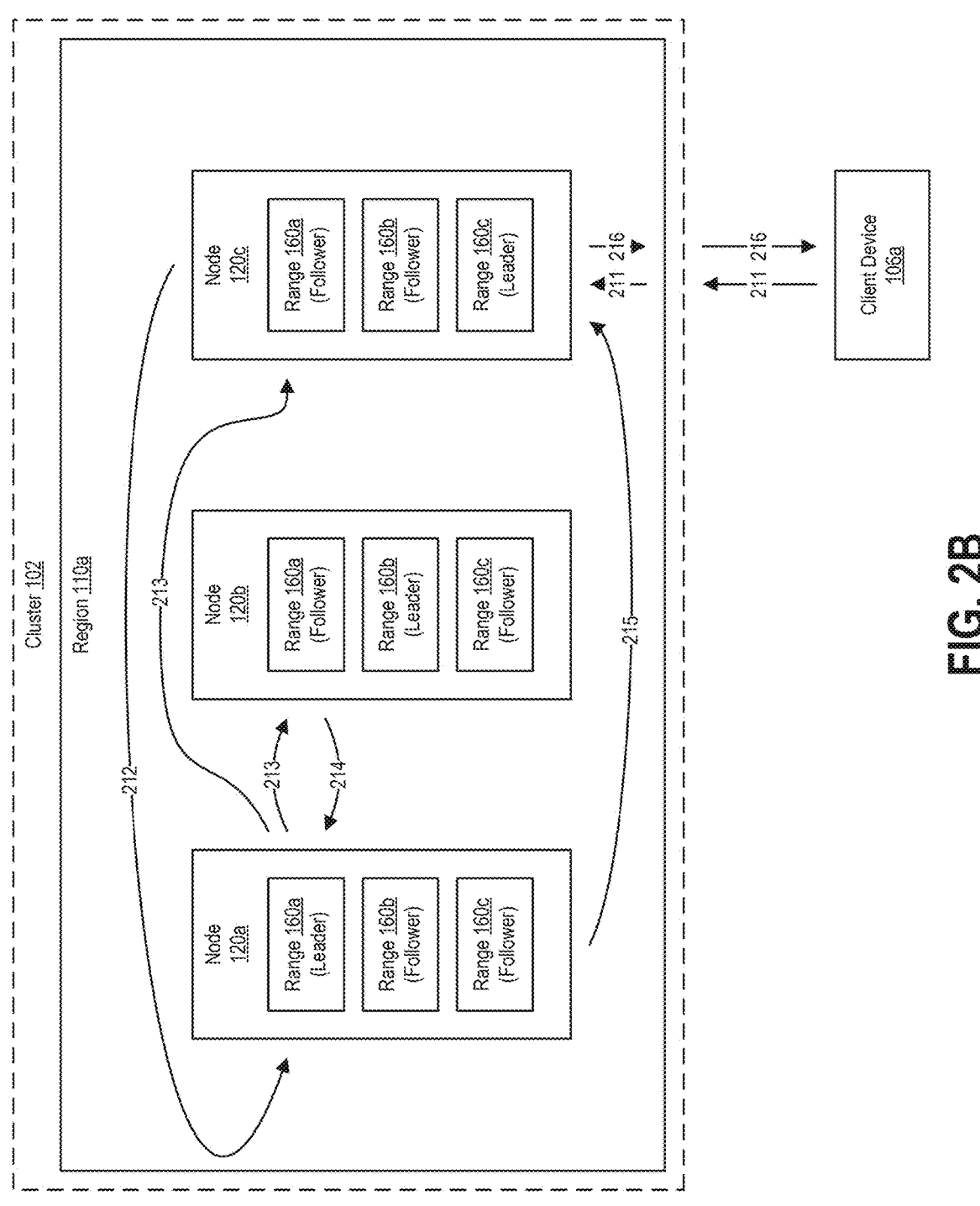
FIG. 2B shows an example of execution of a write transaction at the computing system, according to some embodiments.

Referring to FIG. 2B, an example of execution of a write transaction including at least one write request at the computing system 100 is presented. In some cases, as described herein, the nodes 120a, 120b, and 120c, of region 110a may include one or more replicas of ranges 160. The node 120a may include replicas of ranges 160a, 160b, and 160c, where ranges 160a, 160b, and 160c are different ranges. The node 120a may include the leaseholder replica and the leader replica for range 160a (as indicated by "Leaseholder" in FIG. 2A and "Leader" in FIG. 2B). The node 120b may include replicas of ranges 160a, 160b, and 160c. The node 120b may include the leader replica for range 160b (as indicated by "Leader" in FIG. 2B). The node 120c may include replicas of ranges 160a, 160b, and 160c. The node 120c may include the leader replica for range 160c (as indicated by "Leader" in FIG. 2B). While FIG. 2B is described with respect to communication between nodes 120 of a single region (e.g., region 110a), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route write request(s) of the write transaction to a leaseholder of the range 160 comprising the KVs indicated by the write transaction. The leaseholder of the range 160 may route the write request(s) to the leader replica of the range 160. In most cases, the leaseholder of the range 160 and the leader replica of the range 160 are the same. The leader replica may append the write request(s) to a Raft log of the leader replica, write intent(s) corresponding to the write request(s), and may send the write request(s) to the corresponding follower replicas of the range 160 for replication. Follower replicas of the range may append the write request(s) to their corresponding Raft logs, write intent(s) corresponding to the appended write request(s), and send an indication to the leader replica that the write request(s) were appended. Based on a threshold number (e.g., a majority) of the replicas indicating and/or sending an indication to the leader replica that the write request(s) were appended, the write transaction may be committed by the leader replica. The leader replica may send an indication to the follower replicas to commit the write request(s) and the write transaction. The leader replica may send an acknowledgement of a commit of the write request (s) and the write transaction to the gateway node. The gateway node may send the acknowledgement to the client device 106.

As shown in FIG. 2B, at step 211, the client device 106 may send a write transaction to the cluster 102. The write transaction may be received by node 120c as the gateway node. The write transaction may be directed to data stored by the range 160a. At step 212, the node 120c may route write request(s) of the received write transaction to node 120a. The write transaction may be routed to node 120a based on the node 120a being the leaseholder of the range 160a. Based on the node 120a including the leader replica for the range 160a, the leader replica of range 160a may append the write request(s) to a Raft log at node 120a. At step 213, the leader replica may simultaneously send the write request(s) to the follower replicas of range 160a on the node 120b and the node 120c. The node 120b and the node 120c may append the write request(s) to their respective Raft logs. At step 214, the follower replicas of the range 160a (at nodes 120b and 120c) may send an indication to the leader replica of the range 160a that the write request(s) were appended to their Raft logs. Based on a threshold number of replicas indicating the write request(s) were appended to their Raft logs, the leader replica and follower replicas of the range 160a may commit the write request(s) and the write transaction. At step 215, the node 120a may send an acknowledgement of the committed write transaction to the node 120c. At step 216, the node 120c may send the acknowledgement of the committed write transaction to the client device 106a to complete the write transaction.

Storage Layer

In some embodiments, the database architecture for databases stored by a cluster (e.g., cluster 102) of database nodes may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (e.g., table data, client data, etc.). For each node, a block cache may be shared between each store of the node. The store(s) of a node may store a collection of replicas of a range as described herein, where a particular replica may not be replicated among stores of the same node (or the same node), such that a replica may only exist once at a node.

In some embodiments, as described herein, the storage layer may use an embedded KV data store (e.g., Pebble). The KV data store may be used with an application programming interface (API) to read and write data to storage devices (e.g., persistent storage devices) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamps may be used to differentiate between different versions of data (e.g., KVs) by tracking commit timestamps for the data. HLC timestamps may be used to identify a garbage collection expiration for a value as to be described herein. In some cases, the storage layer may support time travel queries (e.g., queries directed to MVCC versions of keys at previous timestamps). Time travel queries may be enabled by MVCC versions of keys.

In some embodiments, the storage layer may aggregate MVCC values (e.g., garbage collect MVCC values) to reduce the storage size of the data stored by the storage (e.g., the disk) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

In some embodiments, a storage layer as described herein may be an embedded KV store. The storage layer may enable the cluster to read and write data to storage device(s) of each node. As described herein, data may be stored as KV pairs on the storage device(s) using a storage engine. The storage layer may provide atomic write batches and snapshots, which can indicate a subset of transactions. In some cases, the storage layer may operate an LSM tree at each node of the cluster to manage data storage, where each node stores replicas of one or more ranges of a database within the LSM tree. In some cases, other types of data storage structures, such as a B-tree, may be used in addition or in place of an LSM tree at each node.

Figure 3:
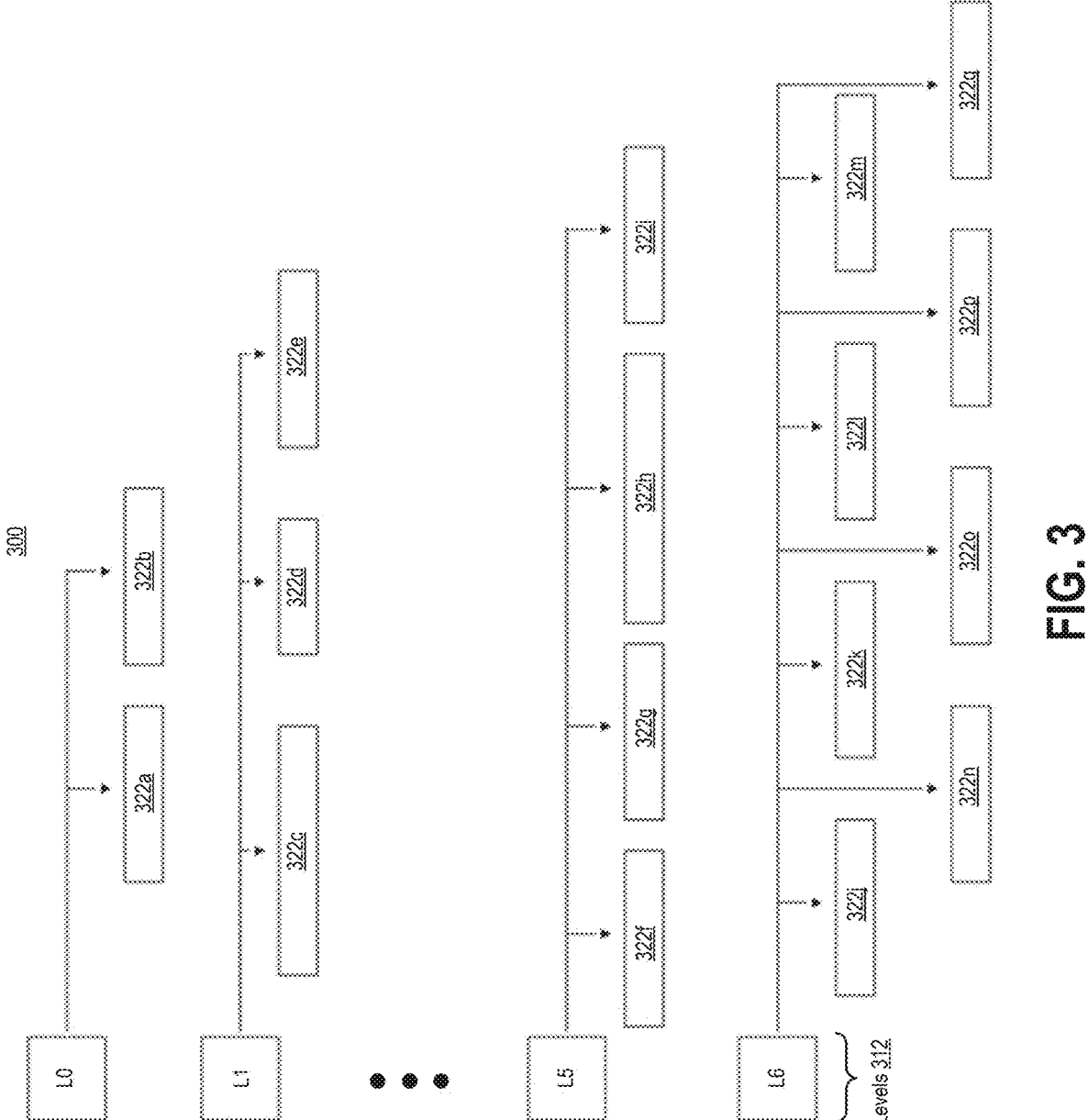
FIG. 3 shows an exemplary illustration of a log-structured merge (LSM) tree of a computing system, according to some embodiments.

In some cases, levels of the LSM tree can be organized in descending order from level 0 (L0) to level 6 (L6), where L0 is the top-most level and L6 is the bottom-most level. New data can be added (e.g., written or flushed) into L0 (e.g., using insert or import operations) and then transferred downward into lower levels of the LSM tree over time. FIG. 3 shows an exemplary illustration 300 of an LSM tree. The LSM tree shown in the illustration 300 include a number of levels 312, including L0, L1, level 2 (L2) (not shown), level 3 (L3) (not shown), level 4 (L4) (not shown), level 5 (L5), and L6. Each level of an LSM tree can be associated with a set of SST files 322 spanning a key space of permissible keys, where each SST file 322: (i) includes keys spanning a segment of the key space, (ii) is immutable, and (iii) has a unique identifier (e.g., a monotonically increasing number). In some cases, a span of sorted keys spanned by the keys of an SST file may be referred to as a "key span" of the SST file. As shown in FIG. 3, the L0 may include SST files 322a and 322b. L1 may include SST files 322c, 322e, and 322c. L5 may include SST files 322f, 322g, 322h, and 322i. L6 may include SST files 322j, 322k, 3221, 322m, 322n, 3220, 322p, and 322q. While the levels 312 of the LSM tree shown and described with respect to FIG. 3 are described as including an exemplary number of SST files, each of the levels 312 may include any suitable number of SST files 322. In some cases, the SST files 322 within some of the levels 312 may be non-overlapping, such that a segment of a key space spanned by a first SST file 322 in a particular level (e.g., L1) does not overlap with a segment of the key space spanned by a second SST file 322 in the same level. For example, if a first SST file of L1 includes a segment of the key space for the keys [A-F] (non-inclusive), a second SST file of L1 will contain a segment of the key space for keys [F-R], and so on. The L0 level may be an exception to such non-overlapping and may be the only level of the LSM tree that can contain SST files including respective segments of the key space that may overlap and have overlapping keys. Such an exception can be necessary to allow LSM tree-based storage engines to support ingesting large amounts of data, such as when using an import statement. Such an exception can be necessary to allow for easier and more efficient flushes of memtables to an LSM tree as described herein.

In some cases, a process of merging (e.g., combining) SST files and transferring the SST files from L0 to lower levels (e.g., L1-L6) in the LSM tree may be referred to as "compaction". Compaction may include deleting one or more SST files in a first, higher level of the LSM tree and writing a new SST file including at least some (e.g., all) the data of the deleted SST file(s) in a second, lower level of the LSM tree that is below (e.g., immediately below) the first level. The storage engine may operate to compact data as quickly as possible. As a result of compaction, lower levels of the LSM tree can (e.g., should) include larger numbers of SST files and/or larger-sized SST files that contain less recently updated keys, while higher levels of the LSM tree can (e.g., should) include smaller numbers of SST files and/or smaller-sized SST files that contain more recently updated keys. A size of an SST file may be a storage (e.g., byte) size of the data included in the SST file. Generally, during normal operation of an LSM tree, lower levels of the LSM tree store more data (e.g., a greater number of bytes) than higher levels of the LSM tree. In some cases, compaction rates may refer to rates at which sorted string tables (SSTs) are merged and moved from a top level (e.g., L0) of the LSM tree downward towards a bottom level (e.g., level 6 (L6)) of the LSM tree. In some cases, compaction may specifically refer to a rate at which SSTs are merged and transferred from L0 of the LSM tree to level 1 (L1) of the LSM tree.

In some cases, the compaction process is necessary to enable efficient operation of an LSM tree. From L0 down to L6 and during normal (e.g., healthy) operation of the LSM tree, each level of the LSM tree should have about $1/10$ (10%) as much data (e.g., by storage size for the data) as the next level below. For example, L1 should store about $1/10$ the amount of data stored by L2, L2 should store about $1/10$ of the amount of data stored by L3, and so on. For optimized operation of the LSM tree, as much data as possible is stored in larger SST files included in lower levels of the LSM tree. When compaction operations fall behind and SST files are not able to be compacted to lower levels of the LSM tree at a sufficient rate, an inverted LSM tree can form based on accumulation of SST files at higher levels of the LSM tree as described herein.

In some cases, SST files are not modified during the compaction process, such that new SST files can instead be written, and old SST files can be deleted. This design takes advantage of the fact that sequential disk access is faster than random disk access.

In some cases, the process of compaction can operate as follows: if two SST files referred to as SST file "A" and SST file "B" included in a first, higher level of an LSM tree are to be merged to be included in a second, lower level of the LSM tree, their contents (e.g., KV pairs) are read into memory (e.g., volatile storage of a node). Based on reading the contents of the SST files A and B, the contents are sorted (e.g., sorted by key) in a list and merged together in memory, and a new SST file "C" is opened and written to disk (e.g., non-volatile, persistent storage of a node) with the new, larger sorted list of KV pairs in the second level of the LSM tree. Based on the SST file C being written to disk, the old SST files A and B may be deleted from the first level of the LSM tree. Such compaction may operate for more than two SST file being merged into a single SST file.

In some cases, to facilitate managing the LSM tree structure at a particular node of the cluster, the storage engine can maintain an in-memory representation of the LSM tree referred to as a "memory table" or "memtable". In some cases, an LSM tree may not include a memtable (e.g., after a memtable is flushed to L0-L6 of the LSM tree). In some cases, an LSM tree may include one or more memtables. Write operations directed to the LSM tree may be considered durable when the work items for write operations have been (i) added to a memtable (e.g., thereby making the written value(s) visible to subsequent read operations), and (ii) written to a write-ahead log (WAL) file. A memtable may have a fixed amount of memory (e.g., 128 MB), such that when a memtable is full, the memtable stops accepting new write operations and a new memtable is generated to receive the new write operations. In some cases, the storage engine may enforce a maximum allowed number of memtables for an LSM tree. As an example, an LSM tree may not include more than 2-10 memtables and may preferably not include more than 4 memtables. In some cases, a process for copying (e.g., transferring) data from a memtable stored by non-persistent storage media and writing the data to an SST file of the LSM tree stored on persistent storage media may be referred to as "flushing". Data from a memtable may be flushed to levels (e.g., L0-L6) of the LSM tree when the memtable reaches a maximum memory capacity. In some cases, a WAL file stored on the persistent storage media can be associated with each memtable to ensure durability in case of node failures (e.g., power loss or other unavailability). The WAL file can store the newest (e.g., freshest or most recent) operations issued to the storage engine by the replication layer. Each WAL file may have a one-to-one correspondence with a memtable. Each WAL file and memtable can be kept in sync and updates from the WAL file and memtable can be written to SST files periodically as part of operations of the storage engine.

Figure 4:
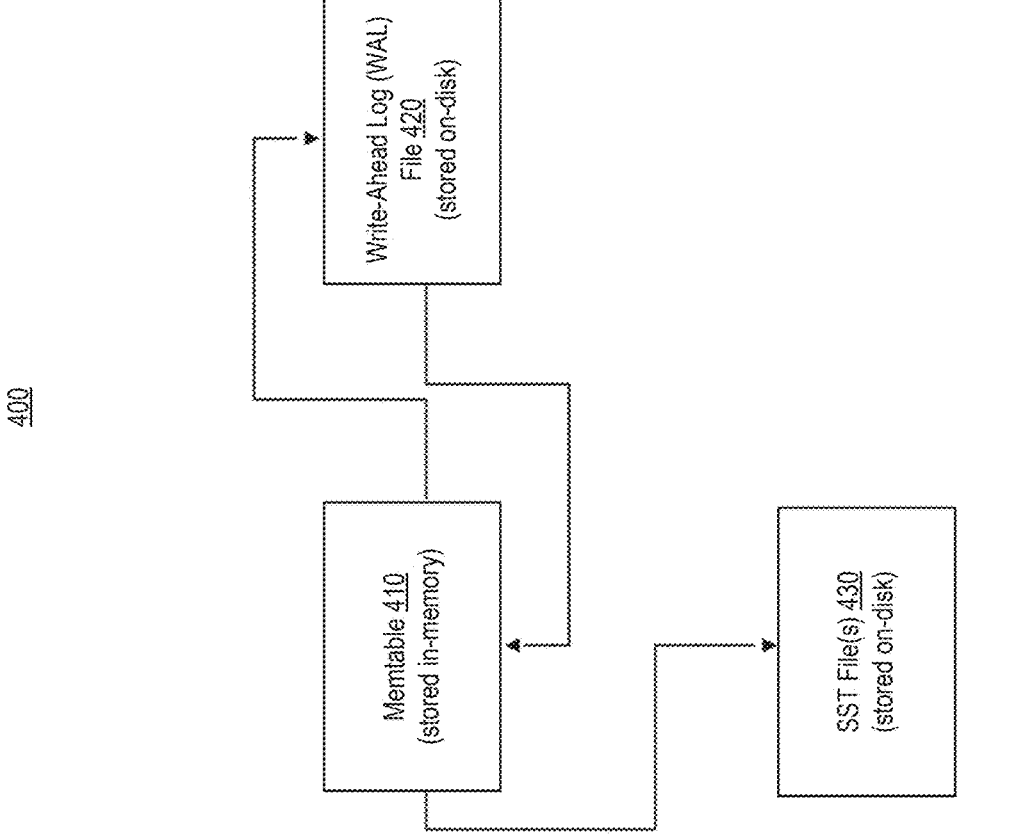
FIG. 4 shows an exemplary block diagram illustrating a storage layer of a computing system, according to some embodiments.

FIG. 4 shows an exemplary block diagram 400 illustrating a relationship between the memtable 410, the WAL file 420, and one or more SST files 430 included in the storage layer of the database. A memtable 410 may be stored in volatile storage media (e.g., random-access memory (RAM)) of a node. A WAL file 420 may be stored on persistent, non-volatile storage media of a node. One or more SST files 430 may be stored on persistent, non-volatile storage media of a node. As shown in FIG. 4, new values may be simultaneously written to the WAL file 420 and the memtable 410. From the memtable 410, the stored values may be eventually written to the one or more SST files 430 on disk for longer-term storage. As described herein, one or more memtables 410 may be included in an LSM tree that each correspond to a respective WAL file 420.

In some cases, a design of the LSM tree can optimize write operation performance over read operation performance. By storing sorted KV data in SST files, the storage engine avoids random disk searches when performing write operations. The storage engine of the storage layer can attempt to mitigate the cost of read operations (random searches) by executing read operations at SST files located in the lowest possible levels of the LSM tree, such that the storage engine reads from fewer, larger SST files. The storage engine performs compaction operations to compact and merge SST files to produce the fewer, larger files located in lower levels of the LSM tree. In some cases, the storage engine can use a block cache to increase the speed of read operations. The tradeoffs in the design of the LSM tree are intended to take advantage of the operating parameters of modern disk storage, since modern disk storage can provide faster read operations of random locations on disk due to caches, but can perform relatively poorly on write operations directed to random locations.

Background on SST Files

Figure 5:
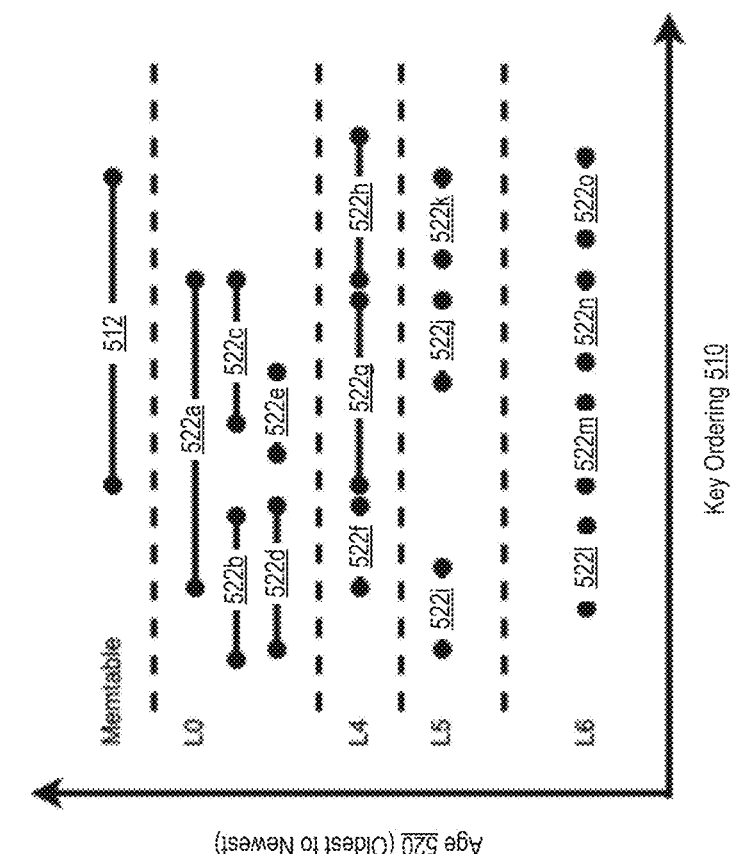
FIG. 5 shows an exemplary illustration of relationship between an LSM tree and a memory table (memtable), according to some embodiments.

As described herein, an LSM tree-based storage layer of a distributed database system can be organized into a plurality of levels (e.g., L0-L6). FIG. 5 shows an exemplary illustration 500 of relationship between an LSM tree and a memtable 512, where the memtable 512 and SSTs 522 (e.g., included SSTs 522a-522p) are organized based on a key ordering 510 and an age 520 of values included in the SSTs. Key ordering 510 may refer to ordering of keys included in a key space, where keys may be ordered using any suitable ordering technique (e.g., alphabetically, numerically, alpha-numerically, and/or chronologically). The age 520 of values included in SSTs may refer to when values corresponding to keys were most recently updated, where the oldest keys are those with the least recently updated values and the newest keys are those with the most recently updated values. Boundaries of the memtable 512 and SSTs 522 as shown in FIG. 5 may correspond to respective segments of the key space that are spanned by keys included in the memtable and SSTs. As described herein, levels L1 and lower (e.g., to L6) of the LSM tree may not include SSTs with keys corresponding to overlapping segments of the key space, while L0 can include SSTs with keys corresponding to overlapping segments of the key space. Read amplification as described herein may refer to a maximum number of files (e.g., memtables and SSTs) in a vertical section of the LSM tree, which can be based on a number of memtables included in the LSM tree, a number of sublevels included in level L0 of the LSM tree, and a number of other levels (e.g., L1-L6) included in the LSM tree. A storage engine of the storage layer may control any and/or all operations corresponding to the LSM tree and a related admission queue for the LSM tree. For example, the storage engine may generate a number of tokens and may admit work items corresponding to write operations from an admission queue based on the work items consuming generated tokens as described herein.

In some cases, the number of files and sublevels included in L0 may be dynamically changing based on a rate of write operations to the LSM tree, such that there is no limit (e.g., upper bound) to the number of files and sublevels included in L0. Accordingly, read amplification can increase without bound, which reduces speeds for read operations. Further, the number of memtables included in an LSM tree may be dynamically changing based on flush rates for flushing memtables to levels of the LSM tree.

In some embodiments, data included in memtables can be flushed to SSTs included in L0 of the LSM tree. In some cases, there may be a maximum number of allowed memtables (e.g., 2, 3, 4, 6, 8, or 10 memtables) for an LSM tree. If a maximum (e.g., threshold) number of memtables is met (e.g., reached), write operations to the LSM tree can stall. Stalling of write operations to the LSM tree can occur when the rate of writing data to memtables based on write operations exceeds the rate of flushing of memtables to L0 of the LSM tree. In some cases, admission to the LSM tree as described herein may refer to admission of work items corresponding to write operations (e.g., included in transactions) to a memtable of one or more memtables, where a work item admitted and written to the memtable may be flushed to the LSM tree after admission from the admission queue.

In some embodiments, based on using admission control techniques to admit work items to the LSM tree, an admission queue may control work items corresponding to write operations admitted to the LSM tree. All write operations directed to a key space of KV data (e.g., stored by virtual SST files and/or physical SST files) included in the LSM tree may be required to enter the LSM tree through the admission queue. In some cases, work items (e.g., write operations) at a front (also referred to as "head") of the admission queue are admitted to the LSM tree when a positive number of "byte tokens" are available for consumption by the work items. A number of byte tokens consumed by a particular work item can be based on (e.g., equivalent to, proportional to, etc.) a size (e.g., number of bytes) of the work item admitted to the LSM tree and/or a size (e.g., number of bytes) occupied by the admitted work item. For example, an amount of data (e.g., number of bytes) corresponding to a number of byte tokens consumed by a work item may be equivalent to a size of a work item. In some cases, a size of a particular work item may be equivalent to an amount of data added to an LSM tree when the work item is admitted to the LSM tree. Consumption of byte tokens by a work item may cause deletion or removal of the consumed byte tokens from the byte tokens available for consumption by other work items. Byte tokens can be computed and generated (e.g., replenished) as described herein. Byte tokens may be used to control and constrain a number of work items admitted from the admission queue to the LSM tree, where a number of available byte tokens may be consumed by work items for admission to the LSM tree, thereby causing other work items to wait for additional byte tokens to be made available. In some embodiments, tokens configured to admit data of any suitable size may be used in place of byte tokens as described herein. Additional features of admission of work items for write operations are described further in U.S. patent application Ser. No. 18/320,671, which is hereby incorporated by reference herein in its entirety.

As described herein, LSM tree storage systems can store KV pairs in SST files included in an LSM tree stored by an individual node. In an SST file, KV pairs are stored and sorted by key in a sequence of data blocks. In some cases, an LSM tree storage system of a particular node may include a number of SST files. Each SST file may (i) correspond to a segment of a key space of permissible keys and (i) have particular key boundaries, such that each SST file includes KV entries corresponding to a particular key span of the key space. A first SST file of a number of SST files may or may not include keys within a range of a second SST file of the number of SST files. For example, for keys ranging from integers of 1-9 (smallest to largest keys), a first SST file may have a key range of [1, 5) and a second SST file may have a key range of [4, 9). An SST file may be selected from a number of SST files of an LSM tree based on a key range of the SST file (e.g., according to a target and/or selected key range indicated by a query). To enable efficient key lookup and range scans, SST files can include an additional index structure referred to herein as a "BlockHandle" (also referred to as a "block handle"). An SST file can include a number (e.g., series) of second-level index blocks, where each second-level index block includes a key per data-block mapped to the second-level index block (e.g., where the key is typically the last key included in the respective data block). A second-level index block may have a maximum capacity (e.g., 256 kilobytes (KB)), such that a number of second-level index blocks are needed for indexing mappings of data blocks to BlockHandles as described herein. Additional second-level index block(s) may be created (e.g., generated) for an SST file based on the second-level index block(s) of an SST file meeting a maximum storage capacity.

In some embodiments, an index block can include one or more KV pairs that each map a key to a BlockHandle, where the BlockHandle is the value mapped to the key in the KV pair. A BlockHandle encodes and identifies the location of a particular block (e.g., index block or data block) within the SST file and can be represented as a tuple. An example tuple that represents a BlockHandle may be (file-offset, block-length), where "file-offset" may indicate the location of a data block or index block within the SST file and "block-length" indicates the length (e.g., data storage size) of the respective data block or index block. Such a tuple may be used by a node to read data from an SST file for a particular interval of the SST file (e.g., starting from a beginning of the SST file) that is defined by a starting position and ending position within the SST file. For example, based on a tuple corresponding to a BlockHandle, a node may read data from the SST file for a byte interval of [file-offset, file-offset+block-length) bytes from a beginning of the SST file. In some cases, an SST file can include a single top-level index block that includes a key per second-level index block (e.g., where the key is typically the last key included in the respective second-level index block). The top-level index block may be hierarchically layered above the second-level index block(s) of the SST file. The top-level index block can map keys to BlockHandles (e.g., where the BlockHandle is the respective value mapped to the key in the KV pair). A BlockHandle can function as a data "pointer" that is used to read the associated block (e.g., second-level index block or data block) indicated by the pointer.

Figure 6:
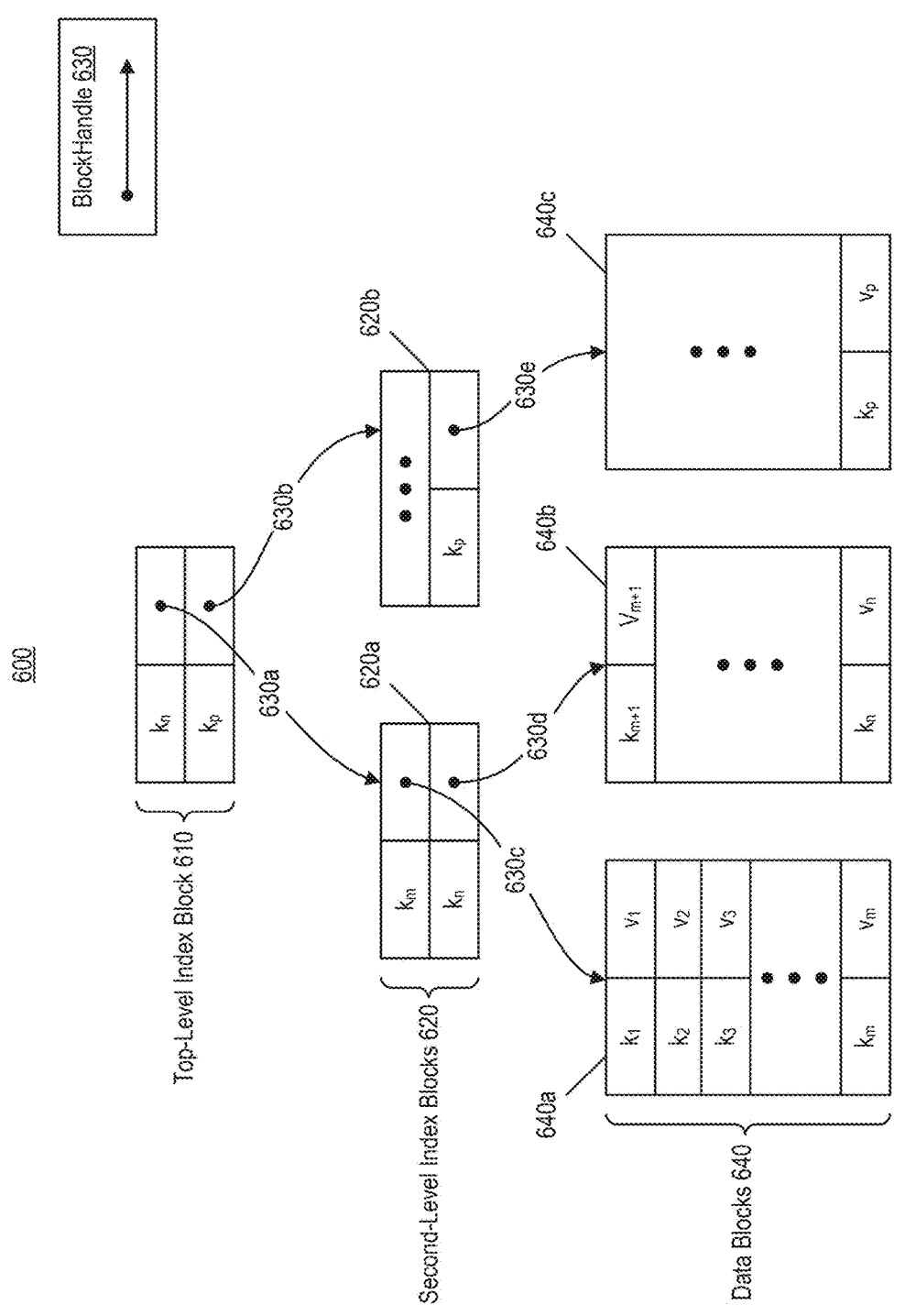
FIG. 6 shows an exemplary illustration of an sorted string table file, according to some embodiments.

FIG. 6 shows an exemplary illustration of an SST file 600. The SST file 600 includes a top-level index block 610, one or more second-level index blocks 620, and one or more data blocks 640. As shown in FIG. 6, "k" refers to a key of a particular KV pair and "v" refers to a value of a particular KV pair. The top-level index block 610 includes a key per second-level index block 620 of the SST file 600. As an example, a top-level index block 610 may include a number of keys equivalent to a number of second-level index blocks 620 included in the SST file 600. As shown in FIG. 6, the top-level index block 610 includes keys $k_n$ and $k_p$ that map to BlockHandles 630a and 630b, respectively. The Block-Handle 630a encodes and identifies the location of the second-level index block 620a within the SST file 600. The BlockHandle 630b encodes and identifies the location of the second-level index block 620b within the SST file 600. The second-level index blocks 620 include a key per data block 640 mapped to each of the second-level index blocks 620. As shown in FIG. 6, the second-level index block 620a includes keys $k_m$ and $k_n$ that map to BlockHandles 630c and 630d, respectively, and the second-level index block 620b includes a key $k_p$ that maps to BlockHandle 630c.

Each of the data blocks 640 can include one or more KV pairs. As shown in FIG. 6, for the index blocks 610 and 620 and data blocks 640 of the SST file 600, "m", "n", and "p" can refer to any suitable identifier, including integers greater than 0. In some cases, keys in each data block 640 may be sorted. For example, for data block 640a, keys may be sorted from $k_1$ to $k_m$, where m is an integer that is greater than 1. Keys in each data block may be sorted using any suitable technique including, for example, alphabetically, numerically, alphanumerically, and chronologically. As shown in FIG. 6, the data block 640a includes keys $k_1$ to $k_m$ which are mapped to values $v_1$ to $v_m$, respectively. The data block 640b includes keys $k_{m+1}$ to $k_n$ which are mapped to values $v_{m+1}$ to $v_n$, respectively, and where n is greater than m. The data block 640c includes one or more KV pairs, including at least key $k_p$ which is mapped to value $v_p$. While the SST file 600 is shown as including the top-level index block 610, the second-level index blocks 620a and 620b, and the data blocks 640a, 640b, and 640c, the SST file 600 may include any suitable number of second-level index blocks 620 based on any suitable number of data blocks 640.

In some cases, an iterator operating at a node of the cluster storing an LSM tree and one or more SST files may be used to query, identify, and return data in response to a particular query operation. To query (e.g., search) the SST file 600, an iterator can first scan the top-level index block 610 and compare the search key (e.g., included in a received query) to the keys included in the top-level index block 610 to find the appropriate second-level index block(s) 620 that includes key(s) corresponding to the search key. In some cases, the search key may include one or more search keys and/or one or more search key ranges. Based on finding the appropriate key in the top-level index block 610 that corresponds to the search key, the iterator decodes the Block-Handle stored in the value mapped to the appropriate key and loads the referenced second-level index block 620. The iterator can load the second-level index block 620 by reading block-length bytes from the SST file 600 starting at position in the SST file indicated by the file-offset included in BlockHandle tuple (e.g., defined by the [file-offset, file-offset+block-length) interval). Based on loading the second-level index block 620, the iterator can scan the second-level index block 620 and compare the search key to the keys included in the second-level index block 620 to find the appropriate data block(s) 640 that includes key(s) corresponding to the search key. Based on finding the appropriate key in the second-level index block 620 that corresponds to the search key, the iterator decodes the BlockHandle stored in the value mapped to the appropriate key and loads the referenced data block 640. Based on loading the referenced data block 640, the iterator can scan the data block 640 to identify the KV data corresponding to the search key. The iterator may cause sending of the KV data corresponding to the search key to a client device (e.g., via a gateway node).

In some embodiments, SST files may include encoded block properties that encode attributes of the KV pairs included in the SST files within the keys and/or values of the KV pairs. Such block properties may be used to filter SST files during execution of queries directed to reading KV data included in the SST files. Additional features of block property collection and filtering are described further in U.S. patent application Ser. No. 18/448,301, which is hereby incorporated by reference herein in its entirety.

Virtual SST Files

As described herein, nodes (e.g., nodes 120) of a cluster (e.g., cluster 102) store data of ranges among a number of SST files, where each individual node stores the SST files that form ones or more of the ranges among levels of an LSM tree. Further, at least a portion of the data of SST files stored by nodes of the cluster may be copied and sent to an external storage system (e.g., external storage system 170), where the external storage system can store the copied data as a number of backup SST files that are based on the SST files stored by the cluster. To enable online restore of backup data from an external storage system (e.g., external storage system 170) to the cluster, virtual sorted string table files (referred to as "virtual SST files") are introduced for storage at individual nodes (e.g., nodes 120) of a cluster. A virtual SST file can identify and point to a key span of a backup SST file stored by the external storage system. In some cases, a virtual SST file can identify and point to a portion of a key span of a backup SST file stored by the external storage system, where the portion of the backup SST file is defined by a portion of the segment of the key span spanned by the keys of the backup SST file. The virtual SST files may enable availability of the data of one or more ranges in place of unavailable SST files, where the virtual SST files can be generated based on identification of a failure and/or an unavailability of one or more nodes of the cluster that stored the currently unavailable SST files. Accordingly, requests originally directed to data of unavailable SST files forming portions of one or more ranges may be redirected to the virtual SST files added to the range(s) and stored by the cluster, where nodes storing the virtual SST files then access and read from the backup SST files identified by the virtual SST files to serve the requests. Further, the nodes storing the virtual SST files can serve the requests using data read from the backup SST files while the backup SST files are copied to and stored by the nodes of the cluster.

In some embodiments, a virtual SST file may abstract access to a backup SST file identified by the virtual SST file, thereby allowing for only a portion of the underlying backup SST file to be exposed to the storage engine operating at a node. Such techniques may provide the advantage of allowing a virtual SST file to identify a key span of only the keys to be included in the range storing the virtual SST file, such that the key span identified by the virtual SST file can be a portion of the wider key span of the backup SST file. For instance, for a backup SST file that includes a key span of the alphabetic keys [A-F], a virtual SST file identifying the backup SST file can be generated that includes a key span of the alphabetic keys [B-D], thereby excluding keys A and E from the virtual SST file. The boundaries of a key span of a virtual SST file may be referred to as "virtual SST file boundaries". Based on a particular backup SST file being able to store KV data included two or more ranges, a virtual SST can beneficially identify a key span of keys included in there range, thereby excluding keys external to the key span of the keys included in the range from the file boundaries of the virtual SST file.

In some embodiments, backup SST files can generally contain much more data and have a greater size than an SST file stored by the cluster. Accordingly, virtual SST files may be generated that identify and point to a portion of the KV data stored by a backup SST file stored by the external storage system. A particular virtual SST file may identify and point to only one backup SST file. In some cases, multiple virtual SST files can identify and point to discrete key spans within the segment of the key space spanned by the same backup SST file. The ability for a virtual SST file to identify and point to only a portion of a key span of a backup SST file can be beneficial by enabling access to a portion of a large backup SST file without (i) copying the entire backup SST file to the cluster. This reduces the amount required to copy files we need make when adding parts of files to different ranges.

Identifier Replacement

In some embodiments, KV data included in SST files stored by the cluster may form tables and/or indexes of a database stored by the cluster. Such tables and/or index may be identified by identifiers (e.g., numeric identifiers) that are encoded into keys (e.g., multi-attribute keys) of the KV data. For example, table and/or index identifiers may be encoded into a prefix of a key included in an SST file, thereby ensuring that keys included in a particular table or index (i) are organized in their own key span of the key space and (ii) do not conflict with the keys of other tables and/or indexes of the database. However, such identifiers can be problematic in the context of data to be copied and stored as backup SST files on the external storage system, as the identifiers included in the keys of the backup SSTs may no longer be usable in the restored database operating by the cluster based on conflicting with a new table and/or index identifiers used within the database. Accordingly, keys of backup SST files copied based on (e.g., from) SST files stored by the cluster may be stored on the external storage system without such table and index identifiers and may instead include a common elided (e.g., omitted) identifier in place of the table and/or index identifiers. When keys of the backup SST files are downloaded (e.g., restored) onto nodes of the cluster with respective values for storage and/or to serve received requests (e.g., read requests and write requests), new identifiers for a table and/or an index including the keys and respective values may be synthesized and added to the keys. For example, table or index identifiers identifying a table or index including a key may be prepended to a key before storage on a node or reading to serve a read request, such that the table or index identifier forms a new prefix for the key when stored by the node or read for a read request. Such techniques for addition of a table or index identifier to a key may be referred to as "identifier replacement". When table or index identifiers are included in keys as prefixes of the keys, such techniques for addition of a table or index identifier to a key may be referred to as "prefix replacement".

In some embodiments, as described herein, the cluster may read and generate a copy of the data (e.g., KV data) of the SST files forming the ranges stored by one or more of the nodes and may send the copied data to the computing device(s) of the external storage system for storage. When backup SST files are written and stored by the external storage system, the keys of the KV data included in the backup SST files may be stored without an identifier of a table or index included in the corresponding KV of the SST files stored by the cluster from which the backup SST files were derived. In place of the identifier of a table or index, the keys of the backup SST files may include a common elided identifier. When virtual SST files are generated and included in ranges of indexes or tables of the cluster, a virtual SST file included in a range of a table or index may point to and identify a particular key span or portion thereof of a backup SST file stored by the external storage system.

In some embodiments, during a download phase of online restore, data from the backup SST files identified by the virtual SST files may be downloaded and stored on nodes of the cluster as newly restored SST files, where each virtual SST file may be included in a particular range of a table or an index. Accordingly, each KV pair included in the restored SST files may be included in a range of a particular table or index. To add an identifier of the respective table or index including a KV pair to the key of the KV pair, identifier (e.g., prefix) synthesis may be performed. For identifier synthesis, when downloading a key span of data of a backup SST file, a node of the cluster may assign, to keys included in the key span of the backup SST file identified by a virtual SST file stored by the node, a common identifier for the table or index including the range including the virtual SST file. The node may add and assign the identifier to each key of the key span before storage in one or more SST file(s), such that the keys stored in the SST file(s) include the identifier of the table or index. For example, the node may prepend the identifier to each key of the key span before storage in one or more SST file(s), such that the keys stored in the SST file(s) include the identifier of the table or index as a prefix.

In some embodiments, when the cluster receives a read request from a client device, the cluster may resolve the read request to identify the ranges and included SST files and/or virtual SST files including key(s) to which the read request is directed. As described herein, each SST file and virtual SST file may be included in a particular range of a table or an index. When the read request is directed to KV data identified by a virtual SST file of a range stored by a node, the node may perform identifier (e.g., prefix) synthesis to add an identifier to the key(s) of the KV data to which the read request is directed. For identifier synthesis, when downloading a key span of data of a backup SST file to serve a read request, a node of the cluster may assign, to keys included in the key span of the backup SST file identified by a virtual SST file stored by the node, a common identifier for the table or index including the range including the virtual SST file. The node may add and assign the identifier to each key of the key span before the key(s) of the key span are read to serve the read request. For example, the node may prepend the identifier to each key of the key span before the key(s) of the key span are read to serve the read request, such that the keys to which the prefix is appended appears as any other key included in the table or index.

Version Replacement

As described herein, a database stored by a cluster (e.g., cluster 102) may use MVCC to maintain multiple versions of keys and values mapped to the keys as KV data stored in ranges of the cluster. For example, each key stored in a range may have a stored MVCC history including respective versions of the key, values for the versions of the key, and/or timestamps at which the respective versions were written and/or committed. Further, with respect to backup SST files, each key of the KV data of the backup SST files may include and have been assigned a timestamp (e.g., according to MVCC) by the cluster 102 for a time at which the key and respective value were written to and stored by a node 120 of the cluster 102. Timestamps of keys may operate as version identifiers for the keys and may be included in a suffix of the key (e.g., when the key is a multi-attribute key). To maintain MVCC compliance for online restore, when backup SST files are restored onto the nodes of the cluster, the timestamps of the keys of the backup SST files may be rewritten to a time at which the key was linked to the cluster. To avoid directly altering the backup SST files, version replacement provides techniques for replacing the timestamps of the keys of the backup SST files without directly modifying the backup SST files.

In some embodiments, when a virtual SST file is linked into and stored by nodes of the cluster, a timestamp (referred to as a "link timestamp") for a time at which the link occurred may be assigned to the virtual SST file. The link timestamp may be stored in metadata of the virtual SST file and the link timestamp can be used as the timestamp for each key of the backup SST file identified by the virtual SST file. When a read request (e.g., originating from a client device) attempts to read a key identified by the virtual SST file, the node storing the virtual SST file may communicate with the backup SST file identified by the virtual SST file, receive the value(s) mapped to the key of the backup SST file from the external storage system, and replace the timestamp of the key from the backup SST file with this new link timestamp. Such techniques for replacement of a timestamp of a key of backup SST file with the link timestamp may be referred to as "version replacement". When timestamps are included in keys as suffixes of the keys, such techniques for replacement of a timestamp of a key of backup SST file with the link timestamp may be referred to as "suffix replacement". Each operation that reads from the virtual SST file may execute version replacement using the link timestamp, thereby maintaining MVCC compliance. As an example, when data blocks of a backup SST file are copied and sent to a node of the cluster to be stored by the node, the in-memory, data blocks may be written to a level of the LSM tree operating on the node, where the timestamps included in the keys of the data blocks may be rewritten to include the respective link timestamp(s) at which the virtual SST file(s) identifying the keys were linked to the node. As another example, when a key of a virtual SST file stored by a node is to be read by a read request, the value(s) mapped to the key of the backup SST file are provided to the node from the external storage system, and the node serves the read request with the value(s) for the key having the link timestamp of the virtual SST file.

US 12,675,372 B2

41

Link Phase

In some embodiments, an individual (e.g., user or system administrator) accessing a cluster (e.g., cluster 102) via a client device (e.g., client device 106) may initiate online restore of one or more ranges formed from SST files to a cluster using backup SST files stored by an external computing system that is separate and distinct from the cluster. In some cases, an individual may initiate the online restore when one or more nodes of the cluster fail, thereby causing unavailability of at least some of the data (e.g., range(s) formed from SST files) stored by the cluster. In some cases, an individual may identify the failure and unavailability of the data and may initiate online restore to cause the backup data (e.g., backup SST files) corresponding to the unavailable data to be copied from the external storage system (e.g., external storage system 170), sent to the cluster, and restored onto the cluster, thereby replacing the unavailable data files. In some cases, an individual may wish to duplicate existing data stored on the cluster and may initiate online restore to cause the backup data (e.g., backup SST files) corresponding to the existing to be copied from the external storage system (e.g., external storage system 170), sent to the cluster, and restored onto the cluster, thereby duplicating the existing data. To initiate the online restore, a client device may send a request to the cluster, where the request identifies one or more ranges, tables, or indexes to be restored onto the cluster from the backup SST files stored by the external storage system. A node of the cluster (referred to as an "initiating node") may receive the request from the client device and may coordinate one or more (e.g., all of) the steps of the online restore process. For example, the initiating node may coordinate one or more of the steps of the link phase as described herein. In some cases, one or more other nodes different from the initiating node may coordinate one or more of the steps of the online restore process. The initiating node may be a node of the cluster that is closest (e.g., by latency, geographic proximity, and/or any other suitable indication of closeness) to the client device. In some cases, the initiating node may operate as a gateway node to the cluster for the client device.

In some embodiments, based on receiving the request to initiate online restore, the initiating node may initiate a link phase to generate one or more new ranges identified by the request. In some cases, the one or more new ranges may be configured to replace unavailable ranges identified by the request and previously stored by nodes experiencing failures. A link phase may include (i) generating, by the initiating node, one or more new, empty ranges (e.g., to replace unavailable ranges or portions thereof), (ii) distributing the new ranges among one or more of the nodes of the cluster, and (iii) ingesting and storing virtual SST files into the new ranges distributed among the nodes of the cluster, thereby making key spans of backup SST files identified by the virtual SST files available to serve requests (e.g., read and write requests) via communication with the backup SST files of the external storage system.

In some embodiments, to initiate online restore, the initiating node may generate a number of new ranges to be stored by one or more of the nodes of the cluster, where each of the new ranges is initially empty and does not initially include KV data. Based on generating the new ranges, the initiating node may access and read entries of the one or more backup metadata files corresponding to the backup SST files stored by the external storage system to identify the backup SST files including backup data that is to be copied and restored to the cluster. Based on identifying the backup metadata file(s) identifying backup SST files including backup data that is to be copied and restored to the cluster, the initiating node may determine the KV data of the backup SST files that is configured to be stored by each of the new ranges, where each new range is configured to store KV data included in one or more of the backup SST files. In some cases, the initiating node may determine key spans of keys of the backup SST files configured to be stored by each of the new ranges by iteratively evaluating the entries of the backup metadata files and identifying the key spans indicated by the entries. In some cases, determining the key spans of the keys of the backup SST files configured to be stored by each of the new ranges may include generating and assigning metadata to each of the ranges, the metadata associating both of (i) key span(s) or portion(s) thereof of one or more of the backup SST files and (ii) identifiers of the one or more of the backup SST files with the respective range. As an example, the metadata assigned to a range by the initiating node may identify a portion of a key span of the backup SST file to be stored by the range and a uniform resource locator (URL) by which to access the backup SST file stored by the external storage system. To evaluate the entries of the backup metadata files, the initiating node may iterate through each of the entries of the backup metadata files that identify key span(s) or portion(s) thereof of the backup SST files that are to be copied and restored to the cluster by identifying a size of a respective backup SST file or portion thereof identified by the entry and a key span of the backup SST file or portion thereof identified by the entry. As described herein, entries of the backup metadata files may only identify a portion of the size of the respective backup SST file and a portion of the key span of the backup SST file. In some cases, the initiating node may iterate through each of the entries of the backup metadata files according to an order of the entries within the backup metadata files to associate identified key span(s) of backup SST files with the newly generated ranges.

In some embodiments, for a particular entry, the initiating node may select a range of the new ranges to which a portion of a key span of a backup SST file identified by the entry can be copied and may determine a size of the portion of the key span of backup SST file as identified by the entry. The initiating node may determine a current size of the selected range and may determine whether adding the identified portion of the key span of the backup SST file to the selected range would cause the selected range to meet or exceed a threshold size. To determine whether adding the identified portion of the key span of the backup SST file to the selected range would cause the selected range to meet or exceed a threshold size, the initiating node may (i) determine a sum of the size of the identified portion of the key span of the backup SST file and the current size of the range and (ii) compare the determined sum to the threshold size. When the sum is less than the threshold size, the initiating node may associate the portion of the key span of the backup SST file identified by the entry with the selected range, such that the selected range is configured to store a portion of a key span from the backup SST file as identified by the entry. For example, the initiating node may generate and assign metadata to the selected range that associates a portion of the key span of the backup SST file with the selected range. When the sum is less than the threshold size and based on the initiating node associating the portion of the key span of the backup SST file identified by the entry with the selected range, the initiating node may select another entry of the backup metadata file, identify the size of the portion of the particular backup SST file identified by the entry, and may determine whether to associate the portion of the key span of the backup SST file identified by the entry with the selected range as described herein. For example, based on selecting the entry identifying a portion of a key span of a particular backup SST file, the initiating node may repeat the steps described herein for determining whether adding the identified portion of the backup SST file to a selected range would cause the selected range to meet or exceed a threshold size. When the sum meets or exceeds the threshold size, the initiating node may deselect the selected range and may not associate a key span from the backup SST file identified by the entry with the selected range, thereby preventing further key spans of backup SST files from being associated with the selected range. When the sum meets or exceeds the threshold size and based on deselecting the selected range, the initiating node may select another different range from the number of newly generated ranges. In some cases, the newly selected range may be adjacent to the previously selected range. Based on selecting another range from the number of generated ranges, the initiating node may repeat the steps described herein for determining whether to associate a portion of the key span of the backup SST file identified by the entry with the selected range by (i) determining a sum of the size of portion of the key span of the backup SST file and a current size of the range and (ii) comparing the sum to the threshold size.

In some embodiments, the initiating node may iterate through each of the entries of the backup metadata files that are to be stored by the new ranges to associate portions of key spans of the backup SST files identified by the entries with the new ranges (e.g., via metadata assigned to the new ranges). In some cases, two more entries can combine to identify an entire key span of a backup SST file, such that the entire key span of the backup SST file is to be stored by one or more ranges. The initiating node may continue to iterate through each of the entries of the backup metadata files that are to be stored by the new ranges until each of the entries of the backup metadata files are associated with a respective new range. In some cases, a new range may be generated on-demand by the initiating node when a selected range is deselected based on a comparison of the determined sum of the size of the portion of the key span of the backup SST file and a current size of the range to a threshold size. For example, when online restore is initiated based on the initiating node receiving the request, the initiating node may generate only the first new range and when the size of the first range will meet or exceed the threshold based on the size of the portion of the key span of the backup SST file to be associated with the first range, the initiating node may deselect the first range and may generate a second new range.

In some embodiments, based on determining the key spans from the backup SST files configured to be stored by each of the new ranges, the initiating node may distribute the new ranges among the nodes of the cluster. The initiating node may distribute the new ranges for storage by random nodes of the cluster and may ensure an even distribution (e.g., based on a number of ranges and/or size of the ranges) of the ranges across the nodes of the cluster. In some cases, based on the determination of the key spans from the backup SST files configured to be stored by each of the new ranges, the new ranges distributed and stored by the nodes of the cluster may only include metadata identifying key span(s) from backup SST file(s) configured to be copied to and stored by the ranges, such that no KV data is stored by the newly generated ranges at this stage of the link phase.

In some embodiments, based on generating and storing the new ranges among one or more of the nodes of the cluster, the initiating node may send, based on the metadata assigned to the new ranges, a number of requests to the one or more nodes of the cluster storing the new ranges to generate and store a number of virtual SST files. After generation and storage of the number of virtual SST files, each of the new ranges may include one or more of the virtual SST files, where each of the virtual SST file(s) identifies and points to only one respective backup SST file stored by the external storage system. To generate and store the virtual SST files, the initiating node may send one or more requests to the one or more nodes of the cluster storing the new ranges, where each request identifies a particular backup SST file or portion thereof for which a virtual SST file will be generated and stored by the range. Each request may include a URL of the backup SST file as identified by the metadata associated with the range as described herein, a portion of the key span of the backup SST file to be identified and made available by the virtual SST file, an identifier (e.g., prefix) synthesis rule including an identifier (e.g., a table identifier or an index identifier) to be added to keys included in the key span (e.g., when stored by the range or read by a request) and the link timestamp at which the data of the backup SST file can appear to have been written to the range. In some cases, each of the requests may be generated based on the metadata assigned to the ranges, where the initiating node retains the information included in the requests to generate the requests. Based on the initiating node sending one or more requests to the one or more nodes of the cluster storing the new ranges, the nodes may have the information necessary to generate and ingest one or more virtual SST files to the new range(s) stored by the nodes, such that the virtual SST files are included in and "linked" to the new range(s) stored by the nodes. Based on linking the virtual SST files to the new range(s), the new range(s) stored by the nodes of the cluster may include the virtual SST files and may serve requests directed to the key spans of backup SST files identified by the virtual SST files. As described herein, when a virtual SST file is linked to a range stored by a node of the cluster, a link timestamp for a time at which the link occurred (e.g., derived from a time indicated by an HLC of the node) may be assigned to the virtual SST file. The link timestamp may be stored in metadata of the virtual SST file and the link timestamp can be used as the timestamp for each key of the backup SST file identified by the virtual SST file.

Download Phase

In some embodiments, based on generation and linking of virtual SST files to the new ranges stored by one or more of the nodes of the cluster, the portions of key spans of the backup SST files identified by the virtual SSTs may be available to serve read and write requests and the new ranges stored by the cluster (e.g., to replace the unavailable ranges) are considered at least partially available. However, if the external storage system and included backup SST files were to become unavailable (e.g., based on a loss of a network connection or failure of computing devices of the external storage system), the new ranges may no longer be available to serve requests based on an inability to access the backup SST files. Further, execution of requests that are directed to the backup SST files via the virtual SST files can have increased latencies relative to execution of requests directed to KV data of SST files that are locally stored by the nodes of the cluster. In some cases, SST files that are located stored by nodes of the cluster can be referred to as "physical SST files". Accordingly, after one or more (e.g., all) of the virtual SST files are linked into the new ranges, it is desirable to initiate download of the KV data of the backup SST files from the external storage system to the new ranges stored by the nodes of the cluster, where KV data of the backup SST files is identified by the virtual SST files. After portions of key spans of backup SST files identified by the virtual SST files are downloaded to the nodes of the cluster and stored in persistent storage, the virtual SST files may be deleted from the cluster.

In some embodiments, for a particular virtual SST file included in a range stored by a node, the node may send a request to the external storage system to download the key span or portion thereof of the backup SST file identified by the virtual SST file. Each node storing a virtual SST file in a range may send a request to the external storage system to download the key span or portion thereof of the backup SST file identified by the virtual SST file for each of the virtual SST files stored by such node. As described herein, a virtual SST file may identify only a portion of a key span of a backup SST file. Based on a node sending the request to the external storage system to download the key span or portion thereof of the backup SST file identified by a virtual SST file, the external storage system may receive the request, read and copy the data block(s) of the backup SST file that include the keys included in the key span identified by the virtual SST file, and send the copied data blocks to the node from which the request originated. The node may download and receive the data blocks from the external storage system and may initially store the received data blocks in-memory in volatile, non-persistent storage media of the node. Based on storing the received data blocks in-memory in volatile, non-persistent storage media of the node, the node may write the data blocks to a level (e.g., a top level) of the LSM tree operating at the node in one or more physical SST files. When written to a level of the LSM tree, such physical SST file(s) including the data blocks may be compacted to lower levels of the LSM tree as described herein.

In some embodiments, based on a virtual SST file identifying only a portion of a key span of a backup SST file, the node storing the virtual SST file may avoid downloading the entirety of the key span of the backup SST file and may only download, for a particular virtual SST file, the data block(s) storing keys that are included the key span identified by the virtual SST file. As an example, based on receiving a request from the node, the external storage system may identify and send the portion of the key span of the backup SST file identified by the virtual SST file to the node.

In some embodiments, based on identifying the portion of the key span of the backup SST file identified by the virtual SST file (i.e., the virtual SST file boundaries), the external storage system may identify a first data block including a key defining a start of the portion of the key span of the backup SST file identified by the virtual SST file and a second data block including a key defining an end of the portion of the key span of the backup SST file identified by the virtual SST file. Based on identifying the first and second data blocks of the backup SST file, the external storage system may copy the first data block, the second data block, and each of the intermediate data blocks included in the backup SST file that are included within the portion of the key span between the first and second data blocks in the backup SST file and may send the data blocks to the node from which the request originated. The node may download and receive the data block(s) from the external storage system and may initially store the received data blocks in-memory in volatile, non-persistent storage media of the node as described herein. By downloading entire data blocks of the backup SST file, the node can advantageously (i) avoid the need to decompress and recompress KV data of the backup SST file at the node and (ii) avoid the need to download the entirety of the backup SST file including data blocks including keys that are not referenced by any virtual SSTs stored by the node. Based on receiving the data block(s) of the backup SST file from the external storage system, the node may generate one or more new index blocks for the received data blocks to identify a position of the keys of the data blocks within an SST file storing the data blocks. The generated index blocks may include one or more features of an index block as described herein.

In some embodiments, when data block(s) included in a key span identified by a virtual SST file and copied from a backup SST file are written to an SST file stored by a node of the cluster, a timestamp of each of the keys included in the SST file may be rewritten to include the link timestamp at which the virtual SST file identifying the keys were linked to the node. Accordingly, a most recent version of KV data copied from a backup SST file linked to a particular virtual SST file and written to an SST file may have a link timestamp of the virtual SST file as its timestamp. After one or more SST files including data blocks with newer versions of keys than previously linked via online restore techniques are written to persistent storage to a top level of an LSM tree, the node on which the SST files are written may delete the now-obsoleted virtual SST files from which the physical SST files were derived, thereby causing request to be directed to the physical SST files in place of the deleted virtual SST files.

In some embodiments, the cluster may prioritize download and compaction of data blocks of particular backup SST files based on frequency of read access to virtual SST files stored by the node. By prioritizing download and compaction of particular first data blocks corresponding to first virtual SST files that are more frequently read relative to second data blocks of second virtual SST files stored by the node, the node may reduce latencies for read requests directed to the first virtual SST files by reducing an amount of time where the read requests are required to read from the backup SST files identified by the first virtual SST files.

In some embodiments, the cluster may send one or more requests to the external storage system to download the key spans or portion thereof of backup SST file(s) identified by the virtual SST file(s) in parallel or serially. The cluster may download one or more data blocks included in key span(s) identified by the virtual SST file(s) in parallel or serially. In some cases, download of data may be limited by network bandwidth (e.g., of network(s) connecting the cluster and the external storage system) and/or persistent storage (e.g., disk storage) bandwidth at nodes of the cluster to which data blocks are downloaded.

Object Provider

In some embodiments, the cluster may operate one or more object providers that track and identify a physical location of SST files stored by the nodes that form a database. In some cases, an object provider may be operated by each node of the cluster. Conventionally, such SST files are assumed to be physically stored by the nodes of the cluster. However, using techniques of online restore, virtual SST files available to serve requests can identify and point to back up SST files stored on an external storage service. Accordingly, the object providers may track and store information identifying a location and a system (e.g., the cluster or the external storage system) on which backup SST files corresponding to virtual SST files are located. The object providers may track and store information on virtual SST files, such that the object providers include information identifying locations of backup SST files identified by virtual SST files stored by ranges of the cluster. In some cases, a node may query the object provider to identify a location of particular key(s) of an SST file or a backup SST file when the particular key(s) are to be read from and/or written to.

In some cases, at each node of the cluster, the object provider stores location and system information for virtual SST files in a catalog stored by persistent storage media of the node. The catalog of the object provider may logically organize a KV map of the virtual SST files stored by the node, where the keys within the KV map are identifiers (e.g., names) for the virtual SST files and values mapped to the keys within the map are location information for the virtual SST files (e.g., name of the virtual SST file, file path of the virtual SST file, and URL for a backup SST file identified by the virtual SST file). When a particular SST file is not identified by the catalog of the object provider operating on a node, the node may identify the SST file as being locally stored on persistent storage of the node, rather than by the external storage system. During a link phase of online restore, a node may populate the catalog of the object provider with information identifying the location of backup files identified by virtual SST files stored by the node.

Reading from Virtual SST Files

As described herein, the cluster can receive read requests directed to read KV data from ranges stored by the cluster. Such read requests can originate from client devices that are communicatively connected to the cluster. Conventionally, read requests are received by a gateway node of the cluster and routed to a node on which the KV data subject to the read request is stored (e.g., in one or more SST files). At the node storing the KV data, the read request is served by reading the values(s) of the key(s) identified by the read request for a particular timestamp. The read value(s) can be sent to the gateway node, and then forwarded to the client device from which the read request originated.

With respect to online restore, KV data subject to a read request may not be locally stored by nodes of the cluster, and may instead be stored by backup SST files operating on an external storage system. Virtual SST files may be included in ranges stored by nodes of the cluster, where the virtual SST files identify and point to backup SST files stored by the external storage system, such that virtual SST files can receive read requests directed to a key span identified by the virtual SST file and cause the keys of the corresponding backup SST file to be provided to the node storing the virtual SST file to serve the read request. Further, recently read data blocks of SST files and data blocks received from the external storage system in response to a read request directed to such data block(s) received may be stored in an in-memory block cache operating at a node of the cluster. Such an in-memory block cache operating at each node of the cluster can eliminate both (i) reading from recently read SST files, and (ii) sending, to the external storage system, repeated requests for the same key span of KV data from backup SST files stored by the external storage system.

In some embodiments, when the cluster receives a read request from a client device, the cluster may resolve the read request to identify the ranges and included SST files and/or virtual SST files including key(s) to which the read request is directed. Based on resolving the read request, the cluster may send the request to a node (e.g., a leaseholder node or follower node) storing the ranges and included SST files and/or virtual SST files subject to the read request. For each file subject to a read request, the cluster can identify the data blocks (e.g., of the SST file and/or backup SST file) to be read to serve the read request. Before reading from either an SST file stored by the node or sending a request for data from a backup SST file identified by a virtual SST file stored by the node, the node may consult the block cache to determine whether the key(s) and respective value(s) to which the read request is directed are stored in the block cache. When the key(s) and respective value(s) to which the read request is directed are stored in the block cache, the node may serve the read request and send to read value(s) to the client device from which the read request originated. When the key(s) and respective value(s) to which the read request is directed are not stored in the block cache and the key(s) are locally stored on an SST file stored by the node, the node may read from the data blocks of the SST file to serve the read request and send to read value(s) to the client device from which the read request originated. When the key(s) and respective value(s) to which the read request is directed are not stored in the block cache and the key(s) are identified by a virtual SST file stored by the node, the node may send a request for the key(s) to the backup SST file identified by the virtual SST file. The node may download and receive data block(s) including the key(s) and respective values from the backup SST file of the external storage system and may read from the received data blocks to serve the read request and send to read value(s) to the client device from which the read request originated. When data block(s) of an SST file or received from a backup SST file of the external storage system are read to serve read request, such data blocks may be stored in a block cache of the node for future access (e.g., by subsequent requests directed to keys included in such data blocks). In some cases, data may be written to a range based on data read by serving a read request, such that a read request is followed by a subsequent write request to write based on the read data.

Writing Using Virtual SST Files

As described herein, the cluster can receive write requests directed to writing KV data to ranges stored by the cluster. Such write requests can originate from client devices that are communicatively connected to the cluster. Conventionally, write requests are received by a gateway node of the cluster and routed to a node (e.g., leader node) on which the KV data subject to the write request is stored (e.g., in one or more SST files). A consensus protocol (e.g., Raft protocol) can then be used to execute the write request by writing and committing data to replicas of a range. At each individual node storing a replica of the range and participating in the consensus protocol, the write operations of the write request are executed by writing new versions of one or more keys and/or key spans with respective values to a memtable of an LSM tree, where the memtable can be flushed to a top level of the LSM tree as described herein. After execution of the write request, an indication of success of the write request can be sent to the gateway node, and then forwarded to the client device from which the write request originated.

With respect to online restore, versions of KV data subject to a write request may not be locally stored by nodes of the cluster, and may instead be stored by backup SST files operating on an external storage system. Virtual SST files may be included in ranges stored by nodes of the cluster, where the virtual SST files identify and point to backup SST files stored by the external storage system, such that a key span including keys stored by one or more virtual SST files can receive write requests directed to the keys stored by the one or more virtual SST files and enable the write request to execute by writing to a memtable operating at a node storing a replica of a range.

In some embodiments, when the cluster receives a write request from a client device, the cluster may resolve the write request to identify the ranges and included SST files and/or virtual SST files including key(s) to which the write request is directed. Based on resolving the write request, the cluster may send the request to the nodes (e.g., a leader node and follower nodes) storing replicas of the ranges and included SST files and/or virtual SST files subject to the write request. At each node receiving the write request and for each file subject to a write request, the cluster can identify the data blocks (e.g., of the SST file and/or backup SST file) including keys to which the write request is directed execute the write request. Based on the consensus protocol, the node may execute the write request by writing one or more new versions of keys with respective values to a memtable operating at the node. The newly written versions of the keys may be flushed to a top level of the LSM tree and written in a physical SST file including a portion of a key span of the keys included in the range(s) stored by the node, thereby replacing a virtual SST file or previous physical SST file including the previous versions of the keys that were overwritten by the newly written versions of the keys.

External Snapshots

While the cluster is operating with virtual SST files that identify and point to backup SST files stored by an external storage system, execution of first read requests directed to KV data stored in the backup SST files can have higher latencies relative to second read requests directed to KV data stored in SST files stored by the cluster. Further, when the external storage system on which the backup files reside is a cloud storage provider service system, additional monetary costs can be incurred based on, for example, (i) the number of times the backup SST files are accessed from the external storage system and (ii) the amount of data read (e.g., downloaded) from the backup SST files. Accordingly, the cluster may be configured to minimize these computational and monetary costs by using alternate approaches to common system operations until the download phase of online restore is completed.

As described herein, ranges are replicated among nodes of a cluster as replicas of the ranges to ensure data availability in the event of software or hardware failures. Based on events such as data size growth, node failures, or node additions, a first node storing a replica of a range may need to send the current state of the replica to a second node so that the second node may store a replica of the range. Conventionally, the first node sends a point-in-time copy of the current state of the replicas of the range to the second node. However, based on introduction of techniques for online restore, virtual SST file(s) that form a portion of a range can require the first node to read a large amount of data from backup SST file(s) identified by the virtual SST file(s) and stored in the external storage system and send the data from the backup SST file(s) to the second node as a part of the snapshot. To avoid the deficiencies of reading and sending a large amount of data from the external storage system to the second node, the cluster may use an optimized point-in-time snapshot that can include virtual SST files for any externally stored backup SST files alongside the SST files located stored at a node that form a portion of a range. For ranges that include data identified by virtual SST files corresponding to externally stored backup SST files having a large size, an optimized point in time snapshot can dramatically reduce the amount of data that needs to be read from the external storage system and then send to the second node.

In some embodiments, a first node may generate an optimized snapshot of a replica of a range, where the snapshot includes one or more virtual SST files are synthesized from the virtual SST files that have been linked to the range (e.g., via the link phase described herein). The key span(s) of backup SST file(s) identified by the virtual SST file(s) included in the snapshot may be restricted to the respective virtual file bounds of the each of the virtual SST files, rather than the entire key spans of the backup SST file(s) identified by the virtual SST file(s). The first node may send the snapshot to the second node and the second node may ingest the SST files and virtual SST files that form the replica of the range. When the second node ingests the snapshot including the one or more virtual SST files, the second node may link in the virtual SSTs as described with respect to the link phase for online restore.

Range Statistics Estimation

In some embodiments, for ranges stored by the cluster (e.g., cluster 102), the cluster may determine and maintain metadata (referred to as "MVCC statistics") for each of the ranges. The MVCC statistics may include a key span of the keys of each range, newest and oldest versions (e.g., timestamps) of the keys included in each range, etc. During a link phase for online restore as described herein, to generate and store the virtual SST files, the initiating node may send one or more requests to the one or more nodes of the cluster storing the new ranges, where each request identifies a particular backup SST file or portion thereof for which a virtual SST file will be generated and stored by the range. In some cases, each request to generate a respective virtual SST file may include estimated MVCC statistics determined from the respective entry of the backup metadata file identifying the portion of a key span of a backup SST file to be linked such virtual SST file. After a virtual SST file is linked to a range, the estimated statistics for the virtual SST file may be added to the MVCC statistics of range with an indicator (e.g., a flag) indicating that the MVCC statistics for the range are estimated and not exactly determined values.

In some embodiments, during an operation to split a first range into second and third ranges, the cluster would conventionally redetermine MVCC statistics for the second and third ranges. However, determining exact MVCC statistics can requires reading (e.g., all of) the keys included in the range. When a range includes a virtual SST file linked to a portion of a key span of a backup SST file, such determination of exact MVCC statistics is computationally expensive due to requirements to read from the external storage system storing the backup SST file. Accordingly, to avoid such a computationally expensive operation when splitting the first range, the cluster may determine whether the first range includes one or more virtual SST files that identify backup SST files. When the cluster determines the first range includes one or more virtual SST files that identify backup SST files, the cluster may skip redetermination of MVCC statistics for the second and third ranges generated by splitting the first range and the cluster may instead use estimated statistics determined based on the entries of the backup metadata files stored by the external storage systems. Based on completion of the download phase as described herein, the cluster may proceed to redetermine exact MVCC statistics for each range that completed downloading and writing KV data to physical SST files and deleting virtual SST files as a part of the online restore operation.

In some embodiments, the cluster may periodically scan stored ranges to check for indications that the KV data of the ranges may have been corrupted. Similar to determination of MVCC statistics as described herein, scanning a stored range to identify corrupted data of the range can requires reading (e.g., all of) the keys and respective values included in the range. When a range includes a virtual SST file linked to a portion of a key span of a backup SST file, such scanning is computationally expensive due to requirements to read from the external storage system storing the backup SST file. Accordingly, to avoid such a computationally expensive operation when scanning a range for corrupted data, the cluster may determine whether a range to be scanned includes one or more virtual SST files that identify backup SST files. When the cluster determines a range includes one or more virtual SST files that identify backup SST files, the cluster may skip scanning for corrupted data included in the range. Based on completion of the download phase as described herein, the cluster may proceed to scan for corrupted data for each range that completed downloading and writing KV data to physical SST files and deleting virtual SST files as a part of the online restore operation.

Time Bound Iteration for Backup SST Files

In some embodiments, a read request received from a client device (e.g., originating from a transaction) can only be required to read versions of keys having timestamp at or after a particular timestamp. In some cases, physical SST files stored by the cluster and backup SST files stored by the external storage system can be filtered using block properties encoded that are representative of attributes of data blocks and index blocks of the SST files. For example, a block property for a range of oldest to newest versions of keys, e.g., minimum to maximum timestamps assigned to keys, can be encoded in a data block or index block based on the keys included in and/or identified by the data block or index block. Accordingly, when KVs are read from an SST file using an iterator, the iterator may use time-bound iteration to skip index blocks and data blocks of backup SST files that include block properties that do not intersect with a target block property or target block property range included in a search key of the read request. For example, when executing a read request including a search key for keys having timestamps greater than or equal to a particular timestamp or within a particular timestamp range, the iterator reading an SST file can identify block properties of index blocks and data blocks included in the SST file that identify timestamps of the index blocks and the data blocks. The iterator can compare, for each block having a block property, the block property for a timestamp to the target timestamp or target timestamp range identified by the search key of the read request. Based on the comparison, the iterator may skip the respective block when the target timestamp or timestamp range does not intersect with (e.g., include or satisfy) the block property for a timestamp and proceed to a next index block or data block. When the target timestamp or timestamp range does not intersect with (e.g., include or satisfy) the block property for a timestamp of an index block, the iterator may skip the index block and all data blocks referenced by the index block and may proceed to a next index block. Based on the comparison, the iterator may open and read the keys of the respective block when the target timestamp or timestamp range does intersect with (e.g., include or satisfy) the block property for a timestamp. Accordingly, for online restore, requests to read and download data blocks from the external storage system may filter stored index blocks and data blocks of the backup SST files based on the search key of the read request directed to key(s) identified by a virtual SST file and included in a key span of the backup SST file. For example, requests to read and download data blocks from the external storage system that are executed by the external storage system may skip index blocks and data blocks having timestamps that do not intersect with the target timestamp or target timestamp range identified by the requests. Such time bound iteration can provide the advantage of reducing latencies for reading and downloading data blocks from the external storage system to the cluster as a part of the download phase of online restore by avoiding reading of data blocks including KVs that do not intersect with the target timestamp or timestamp range of a search key. Additional features of time bound iteration using block properties are described further in U.S. patent application Ser. No. 18/448,301, which is hereby incorporated by reference herein in its entirety.

Exemplary Method for Online Restore

Referring to FIG. 7, an exemplary flowchart of a method 700 for online restore of one or more ranges of a database from backup is illustrated. The one or more ranges may be restored onto a cluster including a number of nodes based on backup SST files stored by an external storage system in communication with the cluster or one or more nodes thereof. While the method 700 is described with respect to restoring range(s) onto a particular cluster, the method 700 may be executed in parallel (e.g., simultaneously) to restore range(s) to one or more clusters for one or more databases each including one or more ranges.

In some embodiments, as described herein, an external storage system can store (i) a number of backup files (e.g., backup SST files) each including backup KV data and (ii) one or more backup metadata files including a number of entries for the backup files, wherein each entry of the number of entries identifies a respective backup file of the backup files, a respective portion of a key span of the backup KV data of such backup file, and a size of such portion of such backup file. The cluster may causing storage, by the external storage system, of (i) the number of backup files and (ii) the one or more backup metadata files for the number of backup files during a backup process.

At step 702, one or more nodes of the cluster may generate and store, based on (i) the number of backup files and (ii) the number of entries of the one or more backup metadata files, a number of ranges among the number of nodes of the cluster. In some cases, as least one backup file of the number of backup files is identified by two or more entries of the number of entries of the one or more backup metadata files. Each entry of the two or more entries can identify a respective distinct portion of the key span of the backup data of the first backup file and a size of such distinct portion of the at least one backup file. As described herein, the plurality of backup files can each be and/or include a backup (SST) file, the backup data can include a number of KV entries each including a key and a value, and for each backup file, the key span of the respective entry of the number of entries identifying such backup file can include a segment of a permissible key space spanned by the KV entries of the backup data of such backup file. Each KV entry of the KV entries of the backup data can include a timestamp at which the KV entry was written to at least one of the nodes prior to storage of the corresponding backup file stored at the external storage system.

In some embodiments, generating and storing the number of ranges can include determining and identifying the one or more backup files including the physical data configured to be stored by a first range of the number of ranges based on the sizes of the portions of such one or more backup files identified by the one or more virtual data files of the first range (e.g., identified by the entries of the backup metadata files). In some cases, generating and storing the number of ranges can include associating the one or more backup files with the first range by generating the one or more virtual data files for the first range, wherein a sum of the sizes of the portions of such one or more backup files (e.g., identified by the one or more virtual data files) is greater than a threshold size. In some cases, generating and storing the number of ranges can include an iterative process for (i) identifying, from a first entry of the number of entries of the one or more backup metadata files, the size of the portion of the respective backup file identified by the first entry, and (ii) associating the size of the portion of such backup file with a first range of the number of ranges by assigning to the first range an indication of the size of portion of such backup file.

At step 704, one or more nodes of the cluster storing the number of ranges can generate and store a number of virtual data files in the number of ranges. Each range of the number of ranges can include one or more virtual data files of the number of virtual data files. The one or more virtual data files for a respective range can identify physical data configured to be stored by the respective range and one or more backup files of the number of backup files, the one or more backup files being associated with the respective range and the physical data including at least a portion of the backup data of the one or more backup files. In some cases, an initiating node that received a request (e.g., from a client device) to restore the one or more ranges to the cluster can send a number of requests to the one or more nodes to generate and store the number of virtual data files. Based on (i) storage of the ranges and (ii) the number of virtual data files, the number of ranges are configured to serve, based on the plurality of virtual data files, one or more client requests (e.g., read requests and/or write requests) directed to the physical data configured to be stored by the ranges. The ranges may read from data blocks of the backup files identified by the virtual data files as described herein to serve read requests. The ranges may overwrite virtual SST files with new versions of one or more keys to execute write requests.

In some embodiments, generating and storing the number of virtual data files in the plurality of ranges can further include determining, for at least one range of the ranges, a respective link timestamp at which each of the one or more virtual data files was stored in the at least one of the ranges by a node of the number of nodes. As described herein, one or more of the number of nodes can store the number of ranges (e.g., generated and stored at step 702). In some cases, generating and storing the number of virtual data files can include sending, from an initiating node to a node storing a first range of the number of ranges, one or more requests identifying the one or more backup files (e.g., portions of key spans of the one or more backup files) associated with the first range. In some cases, generating and storing the number of virtual data files can include generating and storing, by the node and based on receiving the one or more requests, the one or more virtual data files of the first range. In some cases, at least one of the requests identifying the one or more backup files associated with the first range can include (i) an identifier of a first backup file of the one or more backup files associated with the range, (ii) the respective portion of the key span of the backup data of the first backup file, (iii) a prefix synthesis rule, and (iv) a write timestamp (e.g., link timestamp) for the first backup file.

At step 706, for each range of the number of ranges, the one or more nodes storing such range can ingest (e.g., download) the physical data configured to be stored by such range by receiving, from the external storage system, the physical data configured to be stored by such range and storing such physical data in a number of data files. In some cases, each backup file of the plurality of backup files can include a number of data blocks. A node of the cluster storing the first range and/or the external storage system in communication with the node can identify, from the one or more virtual data files of the first range, one or more data blocks of the data blocks of a backup file of the one or more backup files identified by the one or more virtual data files, where one of the data files of the first range can include the one or more data blocks. In some cases, the one or more data blocks can include three or more data blocks, where the three or more data blocks include a starting data block, an ending data block, and one or more intermediate data blocks spanning between the starting data block and the ending data block. A node storing the first range can generate an index block identifying one or more positions of the one or more data blocks within the one of the data files stored by the node.

In some embodiments, as described herein, the cluster of nodes stores at least three replicas of each range of the number of ranges, wherein each of the at least three replicas of a range is stored by a distinct node of the cluster of nodes. At least one node of the cluster can store a first range of the number of ranges. The number of data files of a range can be and/or include a number of physical SST files. The physical data configured to be stored by the first range can include one or more KV entries each comprising a key and a value. In some cases, a number of levels of an LSM tree operated by the node can organize and store the number of physical SST files. Each KV entry of the one or more KV entries can include a timestamp (e.g., in a suffix of the respective key) at which the first range was stored by a node of the cluster.

In some embodiments, the method 700 may further include one or more additional features. In some cases, for each range of the number of ranges generated and stored by the cluster, one or more nodes of the cluster can delete one or more virtual data files of such range based on storing the physical data configured to be stored by such range in the number of data files. Virtual data files may be deleted based on physical SST files overwriting the key spans identified by the virtual data files within an LSM tree of a node. In some cases, a node storing a first range can receive, from the external storage system, the physical data configured to be stored by the first range and store at least a portion of the physical data in a non-persistent storage medium of the node. In some cases, storing the physical data in a number of data files for the first range can include writing, based on the portion of the physical data stored in the non-persistent storage medium, a first data file of the number of data files to a top level of a number of levels of an LSM tree (e.g., stored in a persistent storage medium), the first data file including the portion of the physical data; and deleting the portion of the physical data stored in the non-persistent storage medium. In some cases, storing the physical data in a number of data files can include writing, based on the first data file, a second data file of the number of data files to a lower level of the levels of the LSM tree, where the second data file includes the first data file; and deleting the first data file from the top level of the LSM tree.

In embodiments, as described herein, the number of ranges are configured to serve one or more client requests (e.g., read requests and/or write requests) directed to the physical data configured to be stored by the ranges before the physical data is downloaded to the ranges from the external storage system. In some cases, a node storing a first range of the ranges may receive, from a client device, a read request directed to a portion of the physical data identified by the one or more virtual data files of the first range of the plurality of ranges. The node may send, based on receiving the read request, a download request to the external storage system identifying the portion of the physical data identified by the one or more virtual data files. The external storage system may receive the request and read and copy one or more data blocks derived from the backup data of the one or more backup files, where the one or more data blocks comprises the portion of the physical data identified by the one or more virtual data files. The node may receive, from the external storage system, the one or more data blocks derived from the backup data of the one or more backup files. Based on receiving the one or more data blocks, the node may serve the read request by reading from the one or more data blocks and sending the read value(s) to the client device (e.g., via one or more nodes such as a gateway node). In some cases, when the portion of the physical data to which the read request is directed is stored in non-persistent storage of the node in a block cache, the node may identify, from the block cache, the portion of the physical data identified by the one or more virtual data files and serve the read request based on the block cache without sending the download request to the external storage system.

In some cases, a node storing a first range of the ranges may receive, from a client device, a write request directed to a portion of the physical data identified by the one or more virtual data files of a first range of the plurality of ranges. The node may execute the write request by writing a new version of the portion of the physical data identified by the one or more virtual data files and storing the new version of the portion of the physical data in a non-persistent storage medium. The new version of the portion of the physical data may be new versions of one or more KV entries.

In some embodiments, to initiate execution of the method 700 for online restore, a node of the cluster (e.g., operating as a gateway node and initiating node) can receive, from a client device, a request to initiate a restore of the plurality of ranges. In some cases, with respect to external snapshots, a node storing a first range of the ranges can generate a snapshot of the first range, where the snapshot includes one or more second virtual data files generated based on the one or more virtual data files of the first range. The node can send, to a second node, the snapshot of the first range and the second node can store the one or more second virtual data files, thereby ingesting the first range.

Further Description of Some Embodiments

Figure 8:
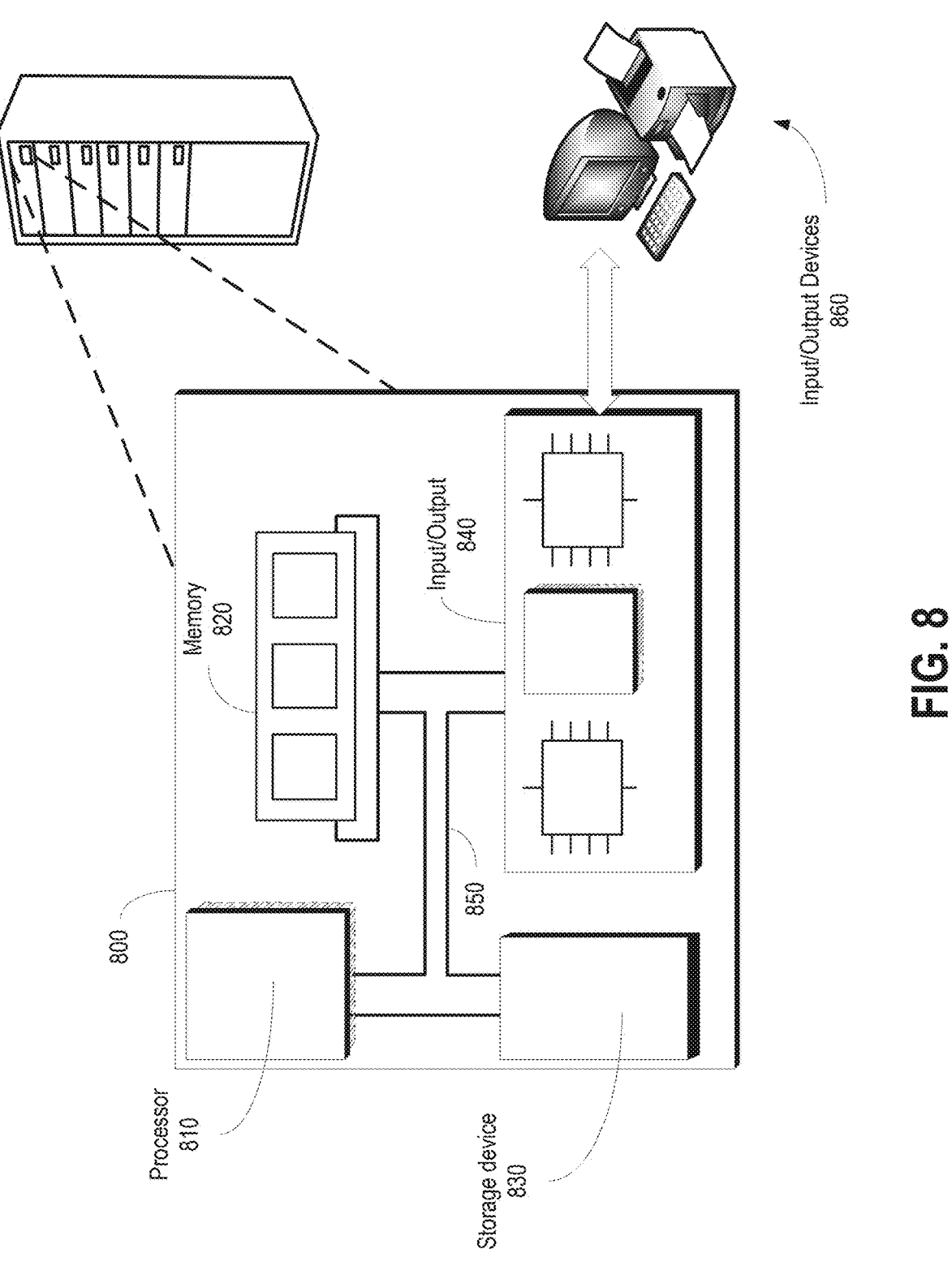
FIG. 8 is a block diagram of an example computer system.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, a 4G wireless modem, or a 5G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for restoring a distributed database, the system comprising:

one or more computing devices configured to perform operations comprising:

generating and storing, based on (i) a plurality of backup files each comprising backup data and (ii) one or more backup metadata files comprising a plurality of entries for the backup files, a plurality of ranges among a plurality of computing devices, the plurality of computing devices comprising the one or more computing devices, wherein an external storage system stores (i) the plurality of backup files and (ii) the one or more backup metadata files, and wherein each entry of the plurality of entries identifies a respective backup file of the backup files, a respective portion of a key span of the backup data of such backup file, and a size of such portion of such backup file;

generating and storing a plurality of virtual data files in the plurality of ranges, wherein each range of the plurality of ranges comprises one or more virtual data files of the plurality of virtual data files, wherein the one or more virtual data files for a respective range point to physical data configured to be stored by the respective range and one or more backup files of the plurality of backup files, the physical data comprising at least a portion of the backup data of the one or more backup files, wherein based on (i) storage of the plurality of ranges and (ii) the plurality of virtual data files, the plurality of ranges are configured to serve one or more client requests directed to the physical data configured to be stored by the ranges; and ingesting, for each range of the plurality of ranges, the physical data configured to be stored by such range by receiving, from the external storage system, the physical data configured to be stored by such range and storing such physical data in a plurality of data files.

2. The system of claim 1, wherein a first backup file of the plurality of backup files is identified by two or more entries of the plurality of entries of the one or more backup metadata files, wherein each entry of the two or more entries identifies a respective distinct portion of the key span of the backup data of the first backup file and a size of such distinct portion of the first backup file.

3. The system of claim 2, wherein (i) the plurality of backup files comprise a plurality of backup sorted string table (SST) files, (ii) the backup data comprises a plurality of key-value entries each comprising a key and a value, and (iii) for each backup file, the key span of the respective entry of the plurality of entries identifying such backup file comprises a segment of a permissible key space spanned by the plurality of key-value entries of the backup data of such backup file.

4. The system of claim 3, wherein each key-value entry of the plurality of key-value entries comprises a timestamp at which the key-value entry was written to at least one of the plurality of computing devices prior to storage of the corresponding backup file stored at the external storage system.

5. The system of claim 1, wherein generating and storing the plurality of ranges comprises:

determining the one or more backup files comprising the physical data configured to be stored by a first range of the plurality of ranges based on the sizes of the portions of such one or more backup files pointed to by the one or more virtual data files of the first range; and associating the one or more backup files with the first range by generating the one or more virtual data files for the first range, wherein a sum of the sizes of the portions of such one or more backup files pointed to by the one or more virtual data files is greater than a threshold size.

6. The system of claim 1, wherein generating and storing the plurality of ranges comprises an iterative process for (i) identifying, from a first entry of the plurality of entries of the one or more backup metadata files, the size of the portion of the respective backup file identified by the first entry, and (ii) associating the size of the portion of such backup file with a first range of the plurality of ranges by assigning to the first range an indication of the size of the portion of such backup file.

7. The system of claim 1, wherein generating and storing the plurality of virtual data files in the plurality of ranges further comprises determining, for at least one range of the ranges, a respective link timestamp at which each of the one or more virtual data files was stored in the at least one of the ranges by a computing device of the plurality of computing devices.

8. The system of claim 1, wherein one or more of the plurality of computing devices store the plurality of ranges, and wherein generating and storing the plurality of virtual data files further comprises:

sending, from an initiating computing device of the plurality of computing devices to a computing device of the plurality of computing devices storing a first range of the plurality of ranges, one or more requests identifying the one or more backup files associated with the first range; and generating and storing, by the computing device and based on the one or more requests, the one or more virtual data files of the first range.

9. The system of claim 8, wherein at least one of the one or more requests identifying the one or more backup files associated with the first range comprises (i) an identifier of a first backup file of the one or more backup files associated with the first range, (ii) the respective portion of the key span of the backup data of the first backup file, (iii) a prefix synthesis rule, and (iv) a write timestamp for the first backup file.

10. The system of claim 1, wherein each backup file of the plurality of backup files comprises a plurality of data blocks, wherein the operations further comprise:

for a first range of the plurality of ranges:

identifying, from the one or more virtual data files of the first range, one or more data blocks of the data blocks of a backup file of the one or more backup files pointed to by the one or more virtual data files, wherein one of the data files of the first range comprises the one or more data blocks.

11. The system of claim 10, wherein the one or more data blocks comprise three or more data blocks, and wherein the three or more data blocks comprise a starting data block, an ending data block, and one or more intermediate data blocks spanning between the starting data block and the ending data block.

12. The system of claim 10, wherein the operations further comprise:

generating an index block identifying one or more positions of the one or more data blocks within the one of the data files.

13. The system of claim 1, wherein (i) the plurality of computing devices stores at least three replicas of each range of the plurality of ranges, and (ii) each of the at least three replicas of a range of the plurality of ranges is stored by a distinct computing device of the plurality of computing devices.

14. The system of claim 1, wherein (i) at least one computing device of the plurality of computing devices stores a first range of the plurality of ranges, (ii) the plurality of data files of the first range comprises a plurality of sorted string table (SST) files, (iii) the physical data configured to be stored by the first range comprises one or more key-value entries each comprising a key and a value, and (iv) a plurality of levels of a log-structured merge (LSM) tree operated by the computing device comprises the plurality of SST files.

15. The system of claim 1, wherein the operations further comprise:

for each range of the plurality of ranges, deleting the one or more virtual data files of such range based on storing the physical data configured to be stored by such range in the plurality of data files.

16. The system of claim 1, wherein the operations further comprise:

causing storage, by the external storage system, of (i) the plurality of backup files and (ii) the one or more backup metadata files for the plurality of backup files.

17. The system of claim 1, wherein the operations further comprise:

receiving, from the external storage system, the physical data configured to be stored by a first range of the plurality of ranges; and storing a portion of the physical data configured to be stored by the first range in a non-persistent storage medium.

18. The system of claim 17, wherein storing the physical data in a plurality of data files for the first range further comprises:

writing, based on the portion of the physical data stored in the non-persistent storage medium, a first data file of the plurality of data files to a top level of a plurality of levels of a log-structured merge (LSM) tree stored in a persistent storage medium, the first data file comprising the portion of the physical data; and deleting the portion of the physical data stored in the non-persistent storage medium.

19. The system of claim 18, wherein storing the physical data in a plurality of data files further comprises:

writing, based on the first data file, a second data file of the plurality of data files to a lower level of the plurality of levels of the LSM tree, wherein the second data file comprises the first data file; and deleting the first data file from the top level of the LSM tree.

20. The system of claim 1, wherein the operations further comprise:

receiving, from a client device, a read request directed to a portion of the physical data pointed to by the one or more virtual data files of a first range of the plurality of ranges;

sending, to the external storage system based on receiving the read request, a download request identifying the portion of the physical data pointed to by the one or more virtual data files;

receiving, from the external storage system, one or more data blocks derived from the backup data of the one or more backup files, wherein the one or more data blocks comprises the portion of the physical data pointed to by the one or more virtual data files; and serving the read request based on the one or more data blocks.

21. The system of claim 20, wherein the operations further comprise:

identifying, from a block cache, the portion of the physical data pointed to by the one or more virtual data files; and serving the read request based on the block cache.

22. The system of claim 1, wherein the operations further comprise:

receiving, from a client device, a write request directed to a portion of the physical data pointed to by the one or more virtual data files of a first range of the plurality of ranges; and executing the write request by writing a new version of the portion of the physical data pointed to by the one or more virtual data files and storing the new version of the portion of the physical data in a non-persistent storage medium.

23. The system of claim 1, wherein the operations further comprise:

receiving, from a client device, a request to initiate a restore of the plurality of ranges.

24. The system of claim 1, wherein the operations further comprise:

generating, by a first computing device of the plurality of computing devices storing a first range of the plurality of ranges, a snapshot of the first range, wherein the snapshot comprises one or more second virtual data files generated based on the one or more virtual data files of the first range;

sending, from the first computing device to a second computing device of the plurality of computing devices, the snapshot of the first range; and storing, by the second computing device, the one or more second virtual data files.

25. A method for restoring a distributed database, the method comprising:

generating and storing, based on (i) a plurality of backup files each comprising backup data and (ii) one or more backup metadata files comprising a plurality of entries for the backup files, a plurality of ranges among a plurality of computing devices, wherein an external storage system stores (i) the plurality of backup files and (ii) the one or more backup metadata files, and wherein each entry of the plurality of entries identifies a respective backup file of the backup files, a respective portion of a key span of the backup data of such backup file, and a size of such portion of such backup file;

generating and storing a plurality of virtual data files in the plurality of ranges, wherein each range of the plurality of ranges comprises one or more virtual data files of the plurality of virtual data files, wherein the one or more virtual data files for a respective range point to physical data configured to be stored by the respective range and one or more backup files of the plurality of backup files, the physical data comprising at least a portion of the backup data of the one or more backup files, wherein based on (i) storage of the plurality of ranges and (ii) the plurality of virtual data files, the plurality of ranges are configured to serve one or more client requests directed to the physical data configured to be stored by the ranges; and ingesting, for each range of the plurality of ranges, the physical data configured to be stored by such range by receiving, from the external storage system, the physical data configured to be stored by such range and storing such physical data in a plurality of data files.

* * * * *